United States Patent
Li et al.

(10) Patent No.: US 12,474,344 B2
(45) Date of Patent: Nov. 18, 2025

(54) SPECTRAL IMAGING PLATFORM FOR INFECTIOUS DISEASE DIAGNOSIS

(71) Applicant: The Board of Trustees of the Leland Stanford Junior University, Stanford, CA (US)

(72) Inventors: Hongquan Li, Stanford, CA (US); Manu Prakash, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 967 days.

(21) Appl. No.: 17/613,162

(22) PCT Filed: May 22, 2020

(86) PCT No.: PCT/US2020/034305
§ 371 (c)(1),
(2) Date: Nov. 22, 2021

(87) PCT Pub. No.: WO2020/242978
PCT Pub. Date: Dec. 3, 2020

(65) Prior Publication Data
US 2022/0206007 A1   Jun. 30, 2022

Related U.S. Application Data

(60) Provisional application No. 62/852,669, filed on May 24, 2019.

(51) Int. Cl.
*B01L 3/00* (2006.01)
*A61B 5/145* (2006.01)
(Continued)

(52) U.S. Cl.
CPC .............. *G01N 33/582* (2013.01); *C12Q 1/04* (2013.01); *G01J 3/10* (2013.01); *G01J 3/2803* (2013.01);
(Continued)

(58) Field of Classification Search
CPC .............. G01N 33/582; G01N 21/6428; G01N 21/6456; G01N 2021/6421;
(Continued)

(56) References Cited

U.S. PATENT DOCUMENTS

| | | |
|---|---|---|
| 5,585,964 A | 12/1996 | Schalz |
| 2004/0159772 A1* | 8/2004 | Cartlidge ........... G01N 21/6458 250/208.1 |

(Continued)

OTHER PUBLICATIONS

Zhang et al. Nanoscale subcellular architecture revealed by multicolor three-dimensional salvaged fluorescence imaging. Nat Methods 17, 225-231 (2020). https://doi.org/10.1038/s41592-019-0676-4.

*Primary Examiner* — Jennifer Wecker
*Assistant Examiner* — Oyeleye Alexander Alabi
(74) *Attorney, Agent, or Firm* — LUMEN PATENT FIRM

(57) ABSTRACT

A low-cost and reconfigurable autonomous microscopy platform is provided capable of automated slide scanning and correlated brightfield and fluorescence imaging. Method of spectral imaging using the platform with applications including infectious disease diagnosis is also provided herein.

7 Claims, 26 Drawing Sheets

(51) Int. Cl.

| | | |
|---|---|---|
| A61B 5/1477 | (2006.01) | |
| A61B 5/15 | (2006.01) | |
| A61B 10/00 | (2006.01) | |
| B01F 33/302 | (2022.01) | |
| B01F 33/3033 | (2022.01) | |
| B01L 7/00 | (2006.01) | |
| B33Y 80/00 | (2015.01) | |
| C12M 1/00 | (2006.01) | |
| C12M 1/34 | (2006.01) | |
| C12M 3/00 | (2006.01) | |
| C12M 3/06 | (2006.01) | |
| C12N 15/10 | (2006.01) | |
| C12Q 1/04 | (2006.01) | |
| C12Q 1/6848 | (2018.01) | |
| C12Q 1/686 | (2018.01) | |
| C12Q 1/689 | (2018.01) | |
| G01J 3/10 | (2006.01) | |
| G01J 3/28 | (2006.01) | |
| G01J 3/44 | (2006.01) | |
| G01N 1/40 | (2006.01) | |
| G01N 21/29 | (2006.01) | |
| G01N 21/64 | (2006.01) | |
| G01N 21/77 | (2006.01) | |
| G01N 21/78 | (2006.01) | |
| G01N 21/84 | (2006.01) | |
| G01N 33/493 | (2006.01) | |
| G01N 33/52 | (2006.01) | |
| G01N 33/543 | (2006.01) | |
| G01N 33/58 | (2006.01) | |
| G01N 35/00 | (2006.01) | |
| G06T 7/00 | (2017.01) | |
| G06T 7/73 | (2017.01) | |
| G06T 7/90 | (2017.01) | |
| G16H 10/40 | (2018.01) | |
| H04N 25/13 | (2023.01) | |

(52) U.S. Cl.
CPC ........ *G01J 3/4406* (2013.01); *G01N 21/6428* (2013.01); *G01N 21/6456* (2013.01); *G06T 7/0012* (2013.01); *G06T 7/90* (2017.01); *A61B 5/15* (2013.01); *A61B 10/0051* (2013.01); *G01J 2003/2806* (2013.01); *G01N 2021/6421* (2013.01); *G01N 2021/6439* (2013.01); *G01N 2333/445* (2013.01); *G06T 2207/10024* (2013.01); *G06T 2207/10056* (2013.01); *H04N 25/13* (2023.01)

(58) Field of Classification Search
CPC ..... G01N 2021/6439; G01N 2333/445; G01N 2800/26; G01N 21/6458; C12Q 1/04; G01J 3/10; G01J 3/2803; G01J 3/4406; G01J 2003/2806; G06T 7/0012; G06T 7/90; G06T 2207/10024; G06T 2207/10056; G06T 2207/10064; G06T 2207/30024; A61B 5/15; A61B 10/0051; H04N 25/13
See application file for complete search history.

(56) References Cited

U.S. PATENT DOCUMENTS

| | | | |
|---|---|---|---|
| 2012/0169863 A1* | 7/2012 | Bachelet | G01N 21/5907 |
| | | | 348/79 |
| 2015/0369664 A1* | 12/2015 | Garsha | G01J 3/44 |
| | | | 356/402 |
| 2018/0332239 A1* | 11/2018 | Peterson | G06T 7/11 |
| 2018/0355242 A1* | 12/2018 | Fraser | C08G 63/6822 |

* cited by examiner

*P. falciparum* lab culture

FIG. 8B

Mycobacterium tuberculosis

FIG. 8D

SPECTRAL IMAGING PLATFORM FOR INFECTIOUS DISEASE DIAGNOSIS

FIELD OF THE INVENTION

The invention relates to devices, methods and systems for infectious disease diagnosis using spectral imaging.

BACKGROUND OF THE INVENTION

Lack of cost-effective diagnostics is a major hurdle in global fight against infectious disease, especially in resource poor settings. This leaves our world in a highly vulnerable position with therapeutic drugs being either overused, leading to drug resistant strains or not accessible to people who actually need these treatments. Since health care is delivered around the world in a tiered structure, local context such as high cost, lack of trained personal or low throughput of many available diagnostics tests plays a large detrimental role on quality of delivered healthcare.

Because of the versatility and wide adoption of manual microscopy and its role in direct visual identification of parasites, it remains a WHO gold standard for numerous diseases. Despite technological advancements in related fields, the practice of conventional manual microscopy has remained largely unchanged over the last half century and suffers from several drawbacks. With an average lab technician spending 6 to 8 hours imaging and examining slides per day, human fatigue has been identified as a crucial factor in reduced efficiency in microscopy-based diagnostics. With heavy disease burden, number of patient samples that need to be processed, even at small primary health centers, can often supersede the capacity of laboratory workers. The above listed limitations for microscopy are not fundamental, and can be circumvented with field implementation of low-cost, motorized microscopes combined with computer-based automated detection.

Low-cost field microscopy has made tremendous strides in the last decade, both towards access and implementing application-specific capabilities. New microscopy techniques such as Fourier ptychographic microscopy and lens-free on-chip microscopy have also been developed to tackle some of the hurdles of conventional microscopy in diagnostics settings. These platforms and techniques have demonstrated a wide range of applications, but high throughput diagnosis of malaria has remained out of reach.

Despite all the resources invested, malaria remains to be a highly deadly disease. In the year of 2017, there were 219 million cases and nearly 435,000 deaths, majority of them occurring due to a strain of malaria widely spread across the world. Two most widely used diagnostic tests are antigen-based Rapid Diagnostic Test (RDT) and microscopic examinations of blood smears. In the same year, 276 million RDTs were sold and more than 208 million patients were tested by microscopy, whereas estimated needs for testing was well over 1 billion. While RDT is easy to use, it cannot quantify parasitemia, stays positive post treatment for up to a month and can create false negative due to HRP2/3 gene deletions. Manual microscopy, on the other hand, is labor intensive and in practice the performance is often compromised. Commercial slide scanning and detection systems show promise, but are currently expensive. With persisting high burden of malaria and the rise of drug resistance strains, affordable, high-throughput and quantitative diagnostic tests are urgently needed. Accordingly, the present invention addresses these concerns.

SUMMARY OF THE INVENTION

Access to quantitative, robust, yet affordable diagnostic tools is necessary to reduce global infectious disease burden. Manual microscopy has served as a bedrock for diagnostics with wide adaptability, although at a cost of tedious labor and human errors. Automated robotic microscopes are poised to enable a new era of smart field microscopy but current platforms remain cost prohibitive and largely inflexible, especially for resource poor and field settings. In one embodiment, a low-cost ($250-$500) and reconfigurable autonomous microscopy platform (Octopi) is provided capable of automated slide scanning and correlated bright-field and fluorescence imaging. Being highly modular, it also provides a framework for new disease-specific modules to be developed. The power of the platform is demonstrated by applying it to automated detection of malaria parasites in blood smears. Specifically, the inventors discovered that a spectral shift on the order of 10 nm for DAPI-stained *Plasmodium falciparum* malaria parasites. This shift allowed the inventors to detect the parasites with a low magnification (e.g. equivalent to 10×) large field of view (e.g. 2.56 mm$^2$) module. Combined with automated slide scanning, real time computer vision and machine learning-based classification, Octopi is able to screen more than 1.5 million red blood cells per minute for parasitemia quantification, with estimated diagnostic sensitivity and specificity exceeding 90% at parasitemia of 50 microliters and 100% for parasitemia higher than 150 microliters. With different modules, the inventors further showed imaging of tissue slice and sputum sample on the platform. With roughly two orders of magnitude in cost reduction, Octopi opens up the possibility of a large robotic microscope network for improved disease diagnosis while providing an avenue for collective efforts for development of modular instruments.

Though illustrated by exemplary embodiment for malaria, the invention is applicable to other infectious disease caused by other parasites or pathogens. Examples to which method and device embodiments of this invention can be applied are, for example, but not limited to infectious diseases caused by *Plasmodium* spp., Schistosomes, *Leishmania* spp., *Trypanosoma* spp., *Mycobacterium tuberculosis*, *Streptococcus* spp., or *Staphylococcus* spp.

In another embodiment, the invention is a spectral imaging platform for infectious disease diagnosis. The platform has an imaging module with a magnification ranging from 1× to 100× which is application specific. In general, low magnification is defined as 1-20×, and high magnification is defined as 40×-100×. In one example, a low magnification of 1×-10× or about 10× worked well. This platform could have interchangeable imaging modules, and in one example module that can be integrated in the spectral imaging platform using magnets. The imaging module is capable of imaging a sample with an added fluorescent dye. Examples of samples are blood samples, sputum samples, nasal swab samples, or the like. Examples of added fluorescent dyes are 4',6-diamidino-2-phe lit dole (DAPI). Some further specifics on the imaging module where the magnification objective could have an object plane pixel size ranging from 0.2 micrometers to 5 micrometers, and a field of view ranging from 0.2 millimeters to 25 millimeters. The imaging module has an illumination module with a laser or LED excitation in the range of 395 nm to 415 nm.

The imaging module has a long pass filter for rejecting excitation illumination and filtering emitted fluorescence from the sample with the added fluorescent dye through the magnification objective, which is application specific. For using with DAPI, the cut-off wavelength can range from 415 nm to 475 nm. In one application, the cutoff wavelength is substantially about 435 nm.

The imaging module further has a CMOS sensor with a color filter array in Bayer arrangements for collecting light in a plurality of channels. In one example, the number of channels is three (RGB). Two or more than three channels is possible with other imaging configurations, e.g. switchable bandpass filters instead of color filter array or using two or more monochrome CMOS sensors with dichroic filters.

An automated computational module, and could be an integral part of the spectral imaging platform, is used to analyze color pixels of the obtained images through the CMOS sensor to determine a spectral shift using color pixel signal ratios. In one example, a spectral shift of about 5 nm is resolved and is application specific. In another example, a spectral shift of about 10 nm is resolved. In yet another example, a spectral shift of at least 5 nm is resolved.

An automated classifier module is used, and could also be an integral part of the spectral imaging platform, to classify and diagnose an infectious disease from the sample using the output from the automated computational module. The automated classifier module is also able to count the number of pathogens.

In yet another embodiment, the invention is a method diagnosing of an infectious disease using a spectral imaging platform. A blood sample with an added fluorescent dye is provided. Example of added fluorescent dyes are 4',6-diamidino-2-phenylindole (DAPI). The blood sample with the added fluorescent dye are imaged using an imaging module as described in the device embodiment with a magnification ranging from 1× to 100×. The emitted fluorescence from the blood sample with the added fluorescent dye is filtered using a long pass filter with a cutoff wavelength ranging from 415 nm to 475 nm. The filtered and the emitted fluorescence from the blood sample with the added fluorescent dye is collected/detected using a CMOS sensor having a color filter array in Bayer arrangements for collecting light in a plurality of channels. Color pixels of the obtained images through the CMOS sensor are analyzed to determine a spectral shift using color pixel signal ratios using an automated computational module. The output from the automated computational module is then used to classify and diagnose an infectious disease from the blood sample. Automation as performed by the automated modules is based on computer implemented method steps executable by a computer device. In a variation of the method, the spectral imaging platform and/or imaging module can be varied as described with respect to the spectral imaging platform embodiment described infra. In addition, the method could be applied to different samples like the ones mentioned infra as well.

In another embodiment, the invention uses a captive linear actuator either alone or coupled to a linear translation stage to enable fine and motorized focus adjustment as well as autofocus. This focus adjustment assembly is an integrable part of the interchangeable imaging module. For lower magnification where fine adjustment or autofocus is not needed, a manual mechanism can be used.

In the last embodiment, the invention includes an ultra-flat scanning mechanism, which involves resting the slide directly on a CNC machined platform and uses lead screw linear actuator driven scanner to move the slide. The measured scan flatness (z-displacement of the slide at the center of the microscope field of view) of less than 400 nm over tens of mm of travel reduces the need for frequent autofocus. This automated slide movement, together with autofocus and automated switching between bright field and fluorescence for each field of view, allows imaging more than 3 million red blood cells per minute in the application of malaria diagnosis.

BRIEF DESCRIPTION OF THE DRAWINGS

FIG. 3A shows the procedure for preparing and scanning a blood smear. FIG. 3B shows a scan of a DAPI-stained blood smear. From left to right: stitched bright field images, a single FOV with overlaid bright field and fluorescent images, zoomed-in overlay image with arrows pointing to (from top to bottom) a platelet, a reticulocyte and a white blood cell. The smear is made from 4 microliters of blood and the region being imaged is of size 20.8 mm×27.2 mm (221 individual field of views), covering more than 90% of the smear. With Raspberry Pi being used as the control & computation module. The scan took 19 minutes. This includes auto-focus using 20-plane z-stacks at the beginning and in the middle of each row that accounts for about ⅓ of the total scan time. When implemented with a control & computation module that has higher bandwidth (such as Jetson Nano), shortening of the total acquisition time to below 4 minutes can be achieved. Besides, in practice, digitizing a much smaller area of the blood smear is often sufficient. FIG. 3C shows steps for segmentation of red blood cells. Left to right: unprocessed portion, portion with preprocessing applied (illumination correction and contrast adjustment), portion with segmentation masked generated from a neural network overlaid. FIG. 3D shows a scan of a Giemsa-stained blood smear with *Loa Loa* (African eye worm). The 9 zoomed-in images are of size 188 micrometers times 188 micrometers. Assuming parasitemia of 100 parasites/microliters of blood, probability of more than 10 parasites present vs total number of microscopic fields of view examined (FIG. 3E). The two curves are for the low mag imaging module (field of view: 1.6 mm×1.6 mm) and for a 100× objective commonly used for malaria diagnosis (field of view: 0.22 mm in diameter). In the calculation, red blood cells are assumed to fill 75% of the field of views. For the probability to be greater than 95%, on average more than 1058 of the 100× field of views need to be examined, whereas only 16 low mag fields of view is sufficient.

FIG. 4A shows pseudo color images of DAPI stained blood smear from a healthy donor and from a patient diagnosed with malaria. The images are acquired on a Zeiss LSM780 laser scanning confocal microscope with a 20×/0.8 objective and 32 spectral channels. For each pixel, the color is determined according to the centroid of the extracted 32-point spectrum for that pixel. FIG. 4B shows extracted spectrum of selected fluorescent spots from image of the patient sample where each spectrum is color-coded according to its spectral centroid in the same way as in FIG. 4A. FIG. 4C shows zoomed-in views of platelets, ring-stage *P. falciparum* malaria parasites and potential *P. falciparum* malaria trophozoites, merozoites and parasites-derived extracellular vesicles. Images are of size 17 micrometers times 17 micrometers.

FIG. 5A shows the process of converting spectrums to RGB values (top) and the resulting colors for different amount of shift. The original spectrum without shift is the emission spectrum from DAPI. FIG. 5B shows an example of demosaiced images of simulated fluorescent spots of different diameter and signal to noise level (left) and their projections in the R/B-G/B space (right; the two clusters have spectral separation of 8 nm). For each parameter combination, 10,000 spots are randomly generated for each class. The spots are assumed to have Gaussian profiles and the diameters are their RMS width. The signal level is the expected value of the maximum pixel intensity of the spot. The number is normalized to have max value of 1, which corresponds to the full well capacity of the CMOS sensor. In determining shot noise for the pixel values, peak quantum efficiency conversion gain of the pi camera module is used (peak QE: 70%, conversion gain: 0.2 e-ADU). The shot noise is modeled by a Poisson process. The position of spots is also randomized. For each spot, R/B is the ratio of total red pixel intensity and total blue pixel intensity, and similarly G/B is the ratio of total green pixel intensity and total blue pixel intensity. The R, G, B pixel values are directly taken from the simulated raw Bayer data.

FIG. 6A shows an image of the same field of view of DAPI-stained smear of *P. falciparum* culture obtained with the low mag imaging module on Octopi (left) and on Nikon Ti2, a high-end research grade microscope, with 20×/0.75 apochromatic objective (right). FIG. 6B shows overlaid bright field and fluorescent images of DAPI-stained smears of *P. falciparum* culture (left) and uninfected whole blood (right) obtained with the low mag imaging module. The color difference of fluorescent spots in the two can be observed. One can also observe that the platelets are all outside right blood cells whereas most parasites are inside the red blood cells. FIG. 6C shows scatter plot of spots corresponding to parasites and platelets in the G/B vs R/B space. The spots are labeled according to whether they come from the *P. falciparum* culture smears or the uninfected whole blood smears. In the scatter plot, 10,000 randomly chosen spots from each class is shown. FIG. 6D shows per spot classification performance for three different classes of classifier with 20-fold cross validation. The first classifier only uses features extracted from the fluorescent image for classification. The second classifier only uses the amount of overlap between the fluorescent spot and the segmented red blood cells. The third classifier uses both fluorescent features and overlap, which gives 0.05% false positive rate at false negative rate of 10%. FIG. 6E shows simulated per case classification performance assuming per spot FNR of $5 \times 10^{-4}$ and FNR of 10% 10,000 tests at each parasitemia level were simulated, assuming examination of 0.5 microliters blood (2.5 million red blood cells) per test. Each test outputs an estimated parasitemia based on the number of red blood cells scanned and number of parasites detected, and this number is compared with a decision threshold for determining the outcome of the test. For each simulated parasitemia, this decision threshold is varied to obtain the sensitivity vs specificity curve. It was noted that per case sensitivity and specificity is a measure of performance at low parasitemia. For higher parasitemia (e.g. above 200 microliters), estimated parasitemia may be directly used. Compared to RDT, the ability to quantify parasitemia is a strength of microscopy and is useful for evaluating disease severeness and monitoring treatment response.

FIG. 7A shows 11 times 11 FOV (4.4 mm times 4.4 mm) scan of DAPI-stained blood smear of a healthy individual. Platelets are visible in the zoomed-in overlaid bright field and fluorescent images (FIG. 7A). Selected field of views showing red blood cells infected with ring-stage parasites. Some red blood cells are infected with multiple red blood cells. Ring like morphology of the parasites is clearly visible (FIG. 7B). Patient sample showing a white blood cell (top left), platelets and infected red blood cells. Each close-up image in (FIG. 7B) and (FIG. 7C) is of size of 12.9 micrometers times 12.9 micrometers. Images were denoised by a pretrained FFDNet denoiser.

FIGS. 8A-F show other diagnostic applications according to an exemplary embodiment of the invention. FIG. 8A shows H&E stained Schistosomiasis of intestines specimen obtained with the low mag imaging module. Close-up images show eggs of *Schistosoma haematobium*. FIG. 8B shows Hematoxylin stained promastigotes of *Leishmania donovani* obtained with the high mag imaging module using a 40×/0.65 Plan Achromatic Objective. FIG. 8C shows Giemsa stained *Trypanosoma brucei* rhodesiense in a thin blood smear obtained with the high mag imaging module using a 40×/0.65 Plan Achromatic Objective. FIG. 8D shows Ziehl-Neelsen stained *Mycobacterium tuberculosis* in a sputum sample obtained with the high mag imaging module using a 100×/1.25 Plan Achromatic Objective. FIG. 8E shows Gram stained *Streptococcus pneumoniae* in a sputum sample obtained with the high mag imaging module using a 100×/1.25 Plan Achromatic Objective. FIG. 8F shows Gram stained *Staphylococcus aureus* in a sputum sample obtained with the high mag imaging module using a 100×/1.25 Plan Achromatic Objective. Left shows minimum intensity projection of a z-stack containing 20 planes with z-step size of 137 nm. Right shows close-up images of different z-planes and the minimum intensity projection corresponding to the same field of view. Images in FIGS. 8A-D were denoised by a pretrained FFDNet denoiser.

DETAILED DESCRIPTION

This invention presents a low-cost ($250-$500), portable (below 3 kg), reconfigurable and automated imaging platform for disease diagnosis in resource constrained settings. To enable versatility of the platform and its adoption for different diseases, a highly modular approach was taken where the platform can be configured with different disease-specific modules. On this platform, automated slide scanning with multimodal imaging with two imaging heads was demonstrated that support a range of magnifications.

In particular, this invention reports a spectral shift on the order of 10 nm for DAPI-labeled malaria parasites when compared to often confounding DAPI-labeled platelets in patient samples. This discovery enables the inventors to integrate three channels of information (bright-field, fluorescence and spectral) for automated detection of parasites with a low magnification imaging module. Large field of view afforded by this module, combined with automated slide scanning and image processing, allows screening of more than 1.5 million red blood cells per minute for infections, which is 120 times faster compared to traditional manual microscopy. A machine learning classifier was further implemented to obtain anticipated performance of higher than 90% specificity and sensitivity for parasitemia of 50 parasites per microliters and 100% sensitivity and specificity for parasitemia of 150 parasites per microliters. The results suggest that low-cost automated multimodal microscopy combined with machine learning tools have the potential to address the unmet needs for diagnosis of malaria and many other diseases.

Automated Imaging Platform with Modular Design

Figure 1:
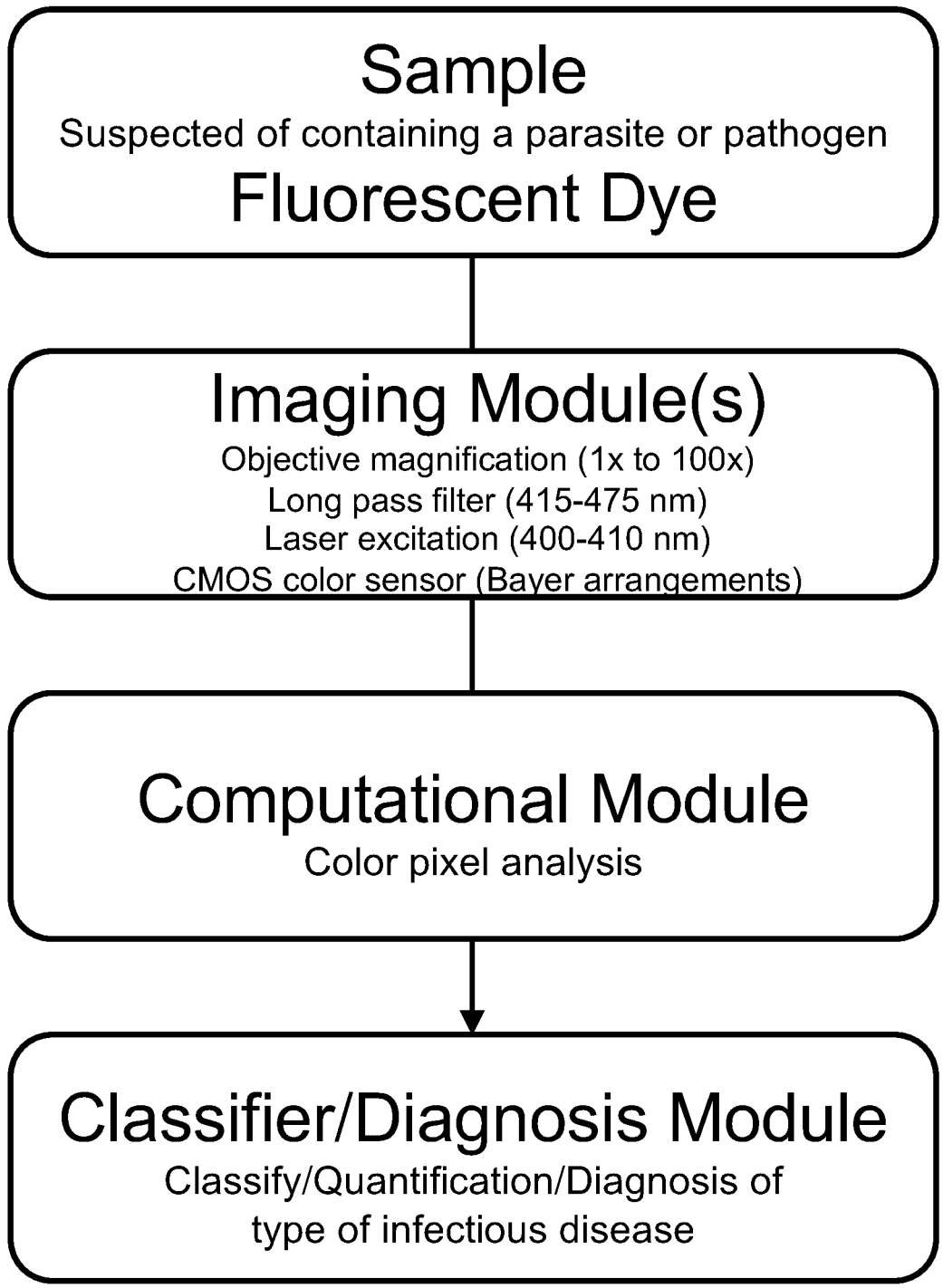
FIG. 1 shows a pipeline of using a spectral imaging platform to diagnose an infectious disease according to an exemplary embodiment of the invention.
Figure 2:
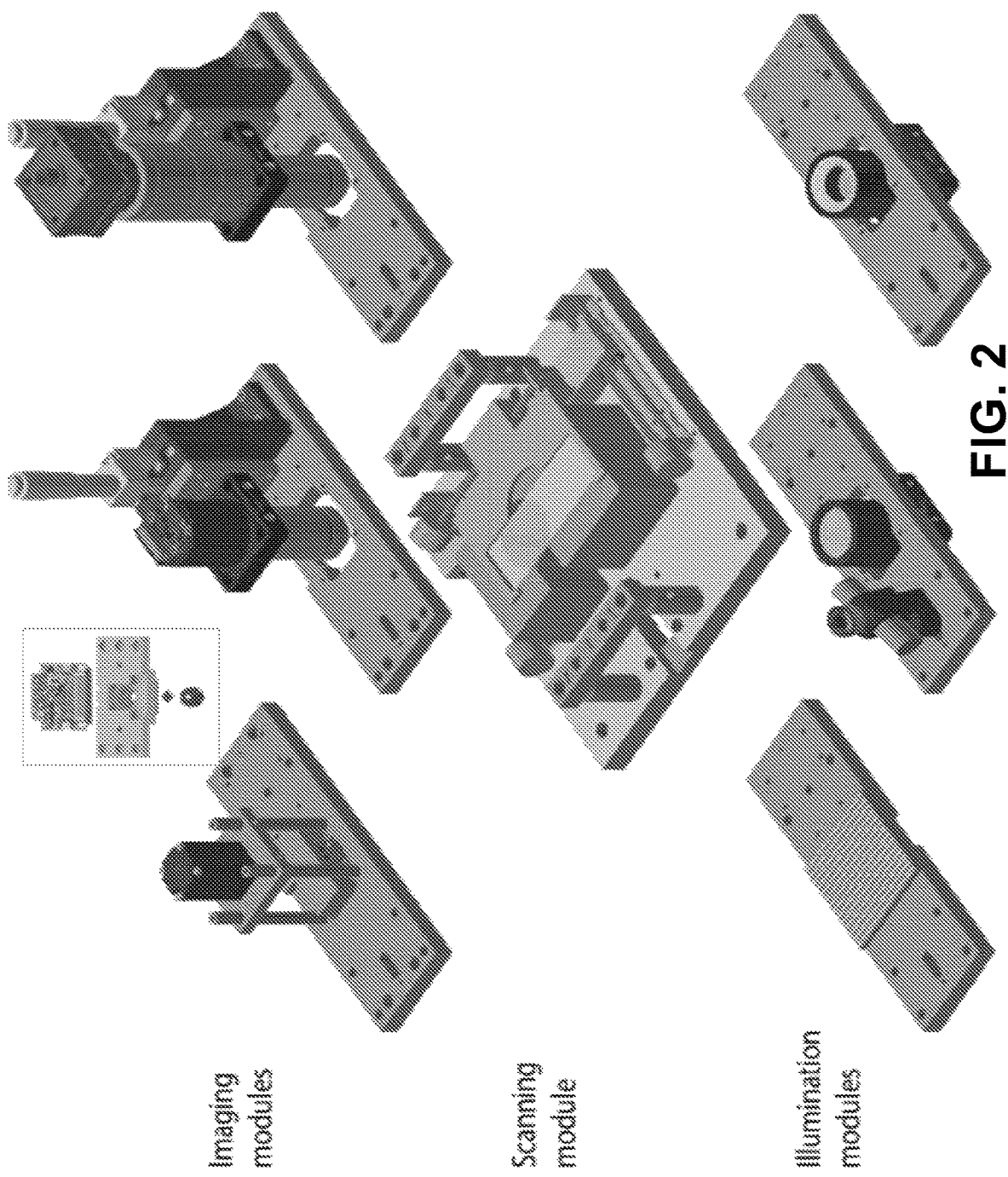
FIG. 2 shows the reconfigurable high-throughput imaging platform and the construction of the modular imaging platform according to an exemplary embodiment of the invention. The left column shows three different imaging modules (top row), a motorized scanning module, and three different illumination modules (bottom row). In the low mag imaging module (top left), a captive linear actuator is used for focus actuation. In the high mag imaging module (top middle and top right), piezoelectric stacks combined with micrometers are used for focus actuation, where the micrometer can be replaced with a captive linear actuator to motorize coarse adjustment. Inset shows the construction of the low-mag imaging module sub-assembly, which has a pi-camera, a long pass interference filter and another cellphone lens. For different applications, sub-assemblies with different configurations should be switched as a whole, in contrast to the high mag imaging module, where objectives, filters, tube lens and cameras can be individually switched. The right column shows some examples of currently available portable computing devices that can be used as the computation module.

The imaging platform has separable modules that fall into 5 categories: imaging, slide scanning, transillumination, oblique angle laser illumination and control and computation (FIG. 2). When setting up the imaging platform preassembled modules snap to each other due to embedded magnets. Since screws are not necessary for the connections, the imaging platform can be rapidly reconfigured.

The platform was designed with a combination of standard and custom parts, with choices being made to optimize performance, size, cost, and ease in prototyping and iterative development. For example, the imaging and transillumination module was made compatible with the standard cage and lens tube system, which allows to quickly implement different configurations. For the custom parts that form the backbone of the microscope, CNC machining with 6061 aluminum was chosen over other manufacturing options for the rigidity of metal, the tight tolerance of the machining process and the low surface roughness of the finished parts. CNC machining also has favorable cost-volume scaling: at the manufacturing quantity of 10, the price is already comparable with 3D printing.

To facilitate wide adoption of the imaging platform, including in resource limited settings, cost is imposed as an important design constraint during development. Through careful choices of parts and their arrangements, the starting unit cost of the imaging platform was able to keep to about $700 for volume of 10 units. Without significantly altering the design, the cost reduces to $350 for volume of 100 units and $250 for volume of 1000 units.

Imaging Modules

Two different imaging modules were implemented, one with low magnification (low mag imaging module) and one with high magnification (high mag imaging module).

Figure 3A:
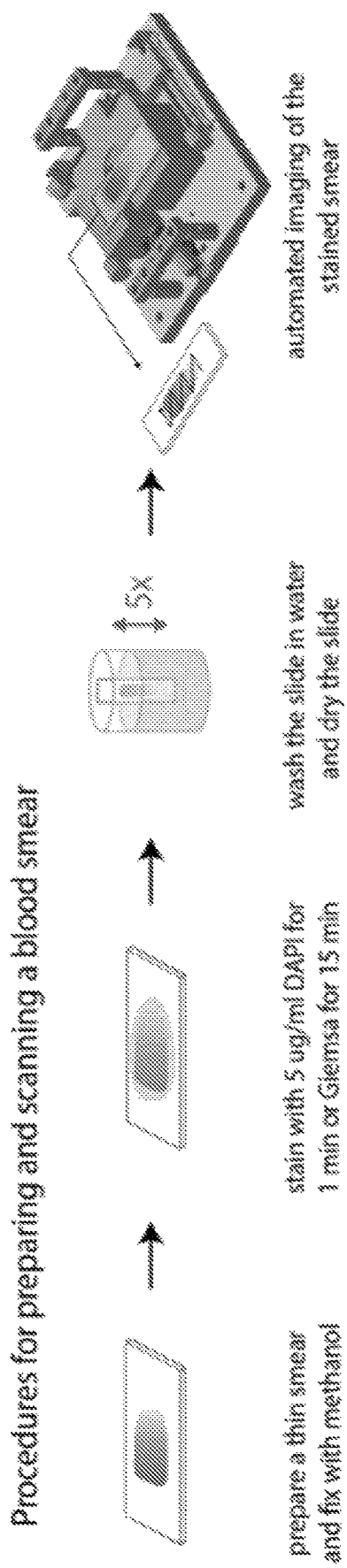
FIGS. 3A-E show blood smear examination aspects according to an exemplary embodiment of the invention.

The low mag imaging module is based on the reversed lens configuration, where two multi-element cellphone lenses are used as objective and tube lens in the infinity-corrected configuration. To enable fluorescence imaging, an interference long pass filter diced into the size of 3 mm×3 mm can be placed in between the two lenses (FIG. 2, inset). The CMOS sensor (Pi Camera based on Sony IMX219), lenses and optional filter are assembled around a CNC machined part as a permanent assembly. Because the cost of the parts is low, for different filters or lens combinations, different permanent assembly can be made. This eliminates the needs for users to handle small and intricate parts and helps keep the optical train free from dusts and contamination. The f-number of the lenses used in our implementation is 2.0, which translates to numerical aperture of 0.25, typical of 10× objectives. With condenser-based transillumination for bright field and oblique angle laser illumination for fluorescence, Nyquist-limited resolution of 2.5 micrometers (2.3 times the object side pixel size) over field of view of more than 1.6 mm×1.6 mm was obtained (FIG. 3A). By using different pairs of lenses, diffraction limited resolution (0.92 micrometers) of a 10×/0.3 NA objective lens may be achieved.

Figure 3B:
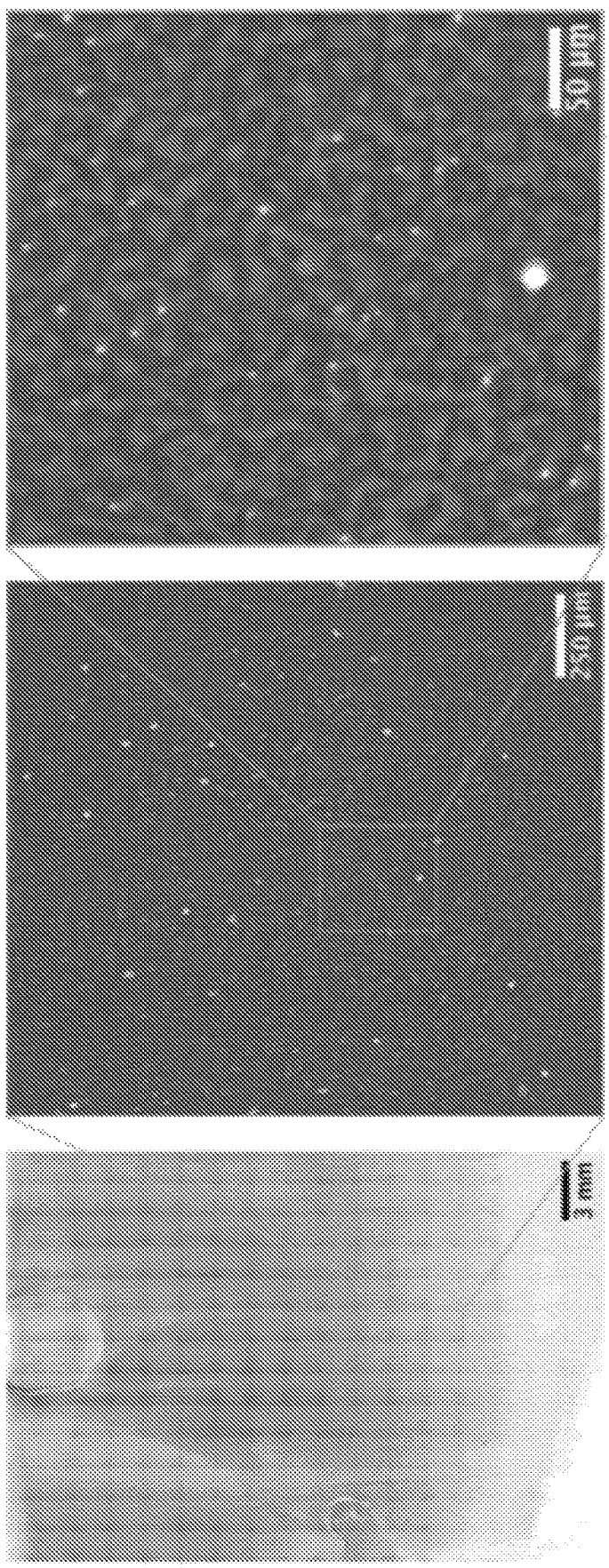

The high mag imaging module makes use of standard infinity-corrected microscope objectives. Depending on required sensitivity and frame rate, Pi Camera or standard industrial camera may be used, with M12 lens or C-mount imaging lens acting as tube lens. Notably, with starting price below $100, industrial cameras with low light CMOS sensors can offer peak quantum efficiency of more than 70% and readout noise as low as 1.1 e-, rivaling the performance of high-end scientific cameras. Using Pi Camera, a f=25 mm M12 lens and a 40×/0.65 Plan Achromatic objective, with the same illumination used for the low mag module, Nyquist-limited resolution of 0.46 micrometers can be achieved with field of view of 0.4 mm×0.4 mm (FIG. 3B).

Figure 3C:
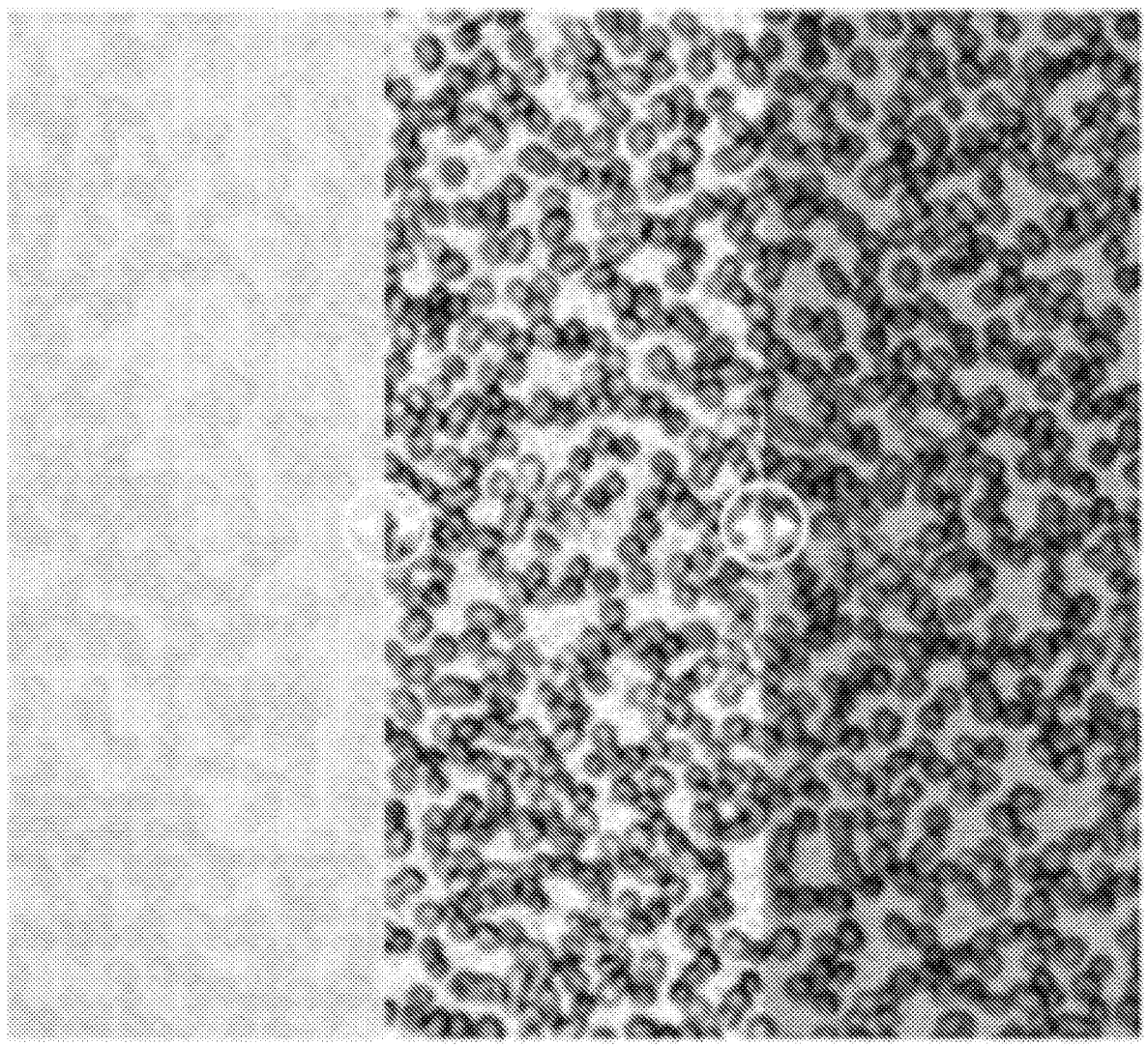
Figure 3D:
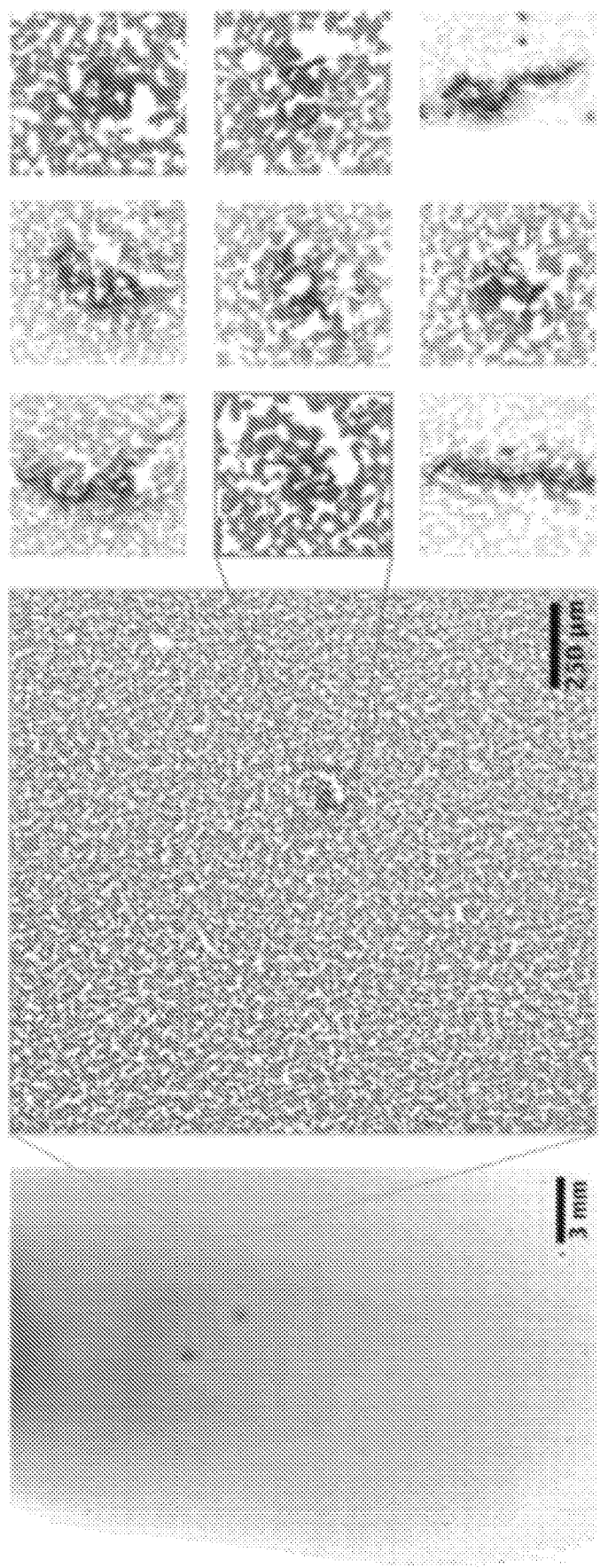

High-throughput automated imaging requires robust auto-focus. In the low mag imaging module, motorized focusing with a captive linear actuator was implemented. The step size of the linear actuator is 1.5 micrometers, which is sufficiently small compared to the depth of focus of more than 8 micrometers. Motorized focus adjustment for the high mag imaging module has more stringent requirements, given the depth of focus is as small as 1 micrometer for a 40×/0.65 objective. As a solution, a low-cost piezo stack actuator and a standard linear translation stage with extended contact ball bearings/crossed roller bearings was combined. The piezo stack actuator used has travel of 11.2 micrometers and step size of 2.73 nanometers when used with a 12-bit digital to analog converter. To test the performance of the motorized focus actuation for the low and high mag module, series of z-stacks of blood smears were acquired and plotted the computed focus measures versus the commanded z-position (FIGS. 3C-D). That the curves lie on top of each other indicates excellent reliability and repeatability. Utilizing the dependence of focus measure on z position, contrast-based auto-focus was implemented. Alternatively, with small modifications in illumination, different single-shot focus-finding approaches can be used for faster focus.

Illumination Modules

The bright field transillumination module has a LED panel, a diffuser and an NA=0.79 condenser. The diffuser is placed at the focal plane of the condenser to make the illumination Kohler-like. Dark-field illumination for low magnification can be provided by a ring of LED, while an LED matrix can be used for quantitative phase imaging, Fourier ptychography and single-shot auto-focus. For fluorescence excitation, use of oblique angle laser illumination can be made. Used in a wide range of consumer electronics such as Blu-Ray/DVD/CD players, projectors and laser pointers, direct diode laser and diode-pumped solid-state lasers that can provide tens to hundreds of mW's optical power are available at a wide range of wavelengths at very low cost. Currently, available wavelengths include 405 nm, 450 nm, 465 nm, 505 nm, 520 nm, 532 nm, 635 nm, 650 nm, 780 nm, 808 nm, 1064 nm. Because of the monochromatic nature of the laser, no excitation filter is needed. The use of oblique angle illumination also eliminates the need for dichroic beam splitter, reducing both the overall size and the cost of the setup. In addition, multiple lasers can be used and electronically switched for multiplexing.

Scanning Module

Motorized slide scanning is crucial for high throughput imaging. Commercial motorized stage for microscopes offers incremental motion as low as a few nanometers, but typically cost thousands of US dollars. Realizing that for wide field imaging such level of positioning performance is not needed, a low-cost scanning module was developed using lead screw linear actuator that costs as little as $5 per unit. An important performance criterion is the scan flatness, which is the relative z-displacement of the slide at the center of the microscope field of view as the slide is being scanned. Good flatness reduces the need for frequent auto-focus. To ensure good scanning flatness, in our present configuration, the slide rests directly on a CNC machined block and is moved by a slide scanner driven by the lead screw linear actuators. To characterize our stage flatness, an ultra-flat quartz coated glass slide was used (and in another measurement, a normal microscope glass slide) as target and measured with a non-contact sensor the displacement of its top surface as it is being scanned. The result, which is limited by measurement setup, suggests overall flatness below 400 nm over tens of millimeters.

Control and Computation Module

Raspberry Pi, a single board computer priced at $35, provides a cost-effective way to control the microscope. The Linux operating system also makes it easy to take advantage of open source software packages and simplifies development. In the Raspberry Pi-based implementation, the camera is interfaced using the industry standard MIPI camera serial interface, whereas other components are controlled through driver boards and MOSFET switches.

With increasing demands for artificial intelligence at the edge, various low-cost and energy-efficient ASIC chips and embedded systems with optimized hardware for computer vision and machine learning applications have recently emerged. For applications requiring more compute power and/or higher imaging throughput, these platforms can be adopted. In particular, implemented and tested here are image processing and spot detection pipelines on Jetson Nano, a $99 drop-in replacement for Raspberry Pi with 128 CUDA cores. This implementation reduces processing time by more than 50 times and allows processing to be done in real time as slides are being scanned. Furthermore, when Windows-only software needs to be used, or more compute power is required, laptops or desktop workstations can also be used.

Power Consumption

When Raspberry Pi or Jetson Nano are used as the control and computation module, the entire system can be powered from 5V DC power supplies. Either a wallplug AC adapter or a battery pack may be used. For a battery pack with capacity of 20,000 mAh, a single charge can power the microscope for more than 8 hours of continuous use (assuming full power consumption).

Automated Blood Smear Examination

Blood smear examination is commonly used for diagnosing blood-borne diseases and often requires imaging many microscopic fields of view. Octopi as a high-throughput imaging platform is particularly suited for these applications. To use the platform, stained blood smear is prepared following the same protocol used for manual microscopy (FIG. 3A). The slide is then loaded to the imaging platform and scanned automatically. For samples stained with fluorescent dyes, in addition to bright field image, a fluorescent image is also taken for each field of view, during which the LED is switched off and the laser is switched on by the controller.

Because of the absence of nucleus in red blood cells, fluorescent dyes that bind to the nucleic acid may be used for staining platelets, white blood cells and many parasites in blood smears with improved contrast compared to bright field stains. The dark field nature of fluorescence imaging also makes it possible to localize stained objects that are below the diffraction limit of the objective being used. This allows us to use low magnification optics that have lower resolutions, but larger field view, resulting in higher imaging throughput. Furthermore, in fluorescent imaging, since angular distribution of emitted light is independent of illumination, full numerical aperture of the objective is automatically utilized.

Among many fluorescent nucleic acid dyes, 4',6-diamidino-2-phenylindole (DAPI) has several attractive properties, including 20-fold fluorescence enhancement upon binding to the AT-region of dsDNA, low-cost (staining a blood smear costs less than $0.02 without reusing the staining solution), and good temperature stability. DAPI solutions are stable at room temperature for 1 to 2 weeks and at +4 degrees Celsius for up to 6 months. In practice, similar staining results were achieved with DAPI solution (at staining concentration of 5 micrograms/ml) left in the dark at room temperature for several months. To demonstrate the use of DAPI with the low mag imaging module on the platform, a smear of whole blood was scanned that is stained in DAPI solution for one minute. In the resulting images, not only white blood cells, but also reticulocytes and platelets can be easily resolved (FIG. 3B).

To be able to robustly extract fluorescent spots for quantification, a two-step processing pipeline was developed. The first step uses top-hat transformation to remove background. The second step uses a blob detector based on the Laplacian of Gaussian (LoG) to detect fluorescent spots of different sizes and intensities. Since filtering operations involved in both steps are computationally expensive for CPUs, a version of the pipeline was implemented that takes advantage of CUDA cores in GPU. When deployed on Jetson Nano for detecting platelets (and later, also malaria parasites), the inventors were able to get per image processing time of around 300 ms, which is more than 50 times faster compared to using a Raspberry Pi 3B+ and 5 times faster compared to using desktop computers. With scanning speed of 1 field of view per second, this allows equivalent blood smear examination throughput of 3,000,000 red blood cells (or 0.6 microliter blood) per minute (assuming red blood cells cover 75% area of the field of view).

Directly counting red blood cells can be beneficial for quantitative analysis of the blood and for determining parasitemia in the case of infection, especially when the precise volume of blood being smeared is not known. However, at low magnification, when cells are only stained with fluorescent dyes, segmentation becomes challenging. In particular, because each red blood cell has only 5-7 pixels in diameter and the contrast is not uniform across the cell, simple thresholding or edge detection-based methods do not work well. Hough transforms used for detecting circular objects requires the image to be scaled up, which leads to significant processing overhead, and has trouble detecting red blood cells that have distorted shapes. To address this challenge, a 91-layer fully convolutional DenseNet was trained, which gives good performance (FIG. 3C). By compressing the model through pruning, quantization and other optimizations and deploying it on Jetson Nano, real-time performance can be expected. To further improve throughput, more lightweight model may be trained and ASIC chips may be used.

To demonstrate use case for detecting larger parasites using only bright-field imaging, a Giemsa-stained blood smear with *Loa-Loa* parasites was digitized (FIG. 3D). Because the parasite can be identified unambiguously, blood volume limited-detection limit of 0.2-0.5 parasites/microliter can be achieved. This detection threshold is well below the Sever Adverse Effect (SAE) threshold of 30 parasites/microliter, above which mass drugs should not be administrated to the individual patient. For screening this particular parasite, video microscopy has also been used and can be configured on Octopi to further improve throughput.

Figure 3E:
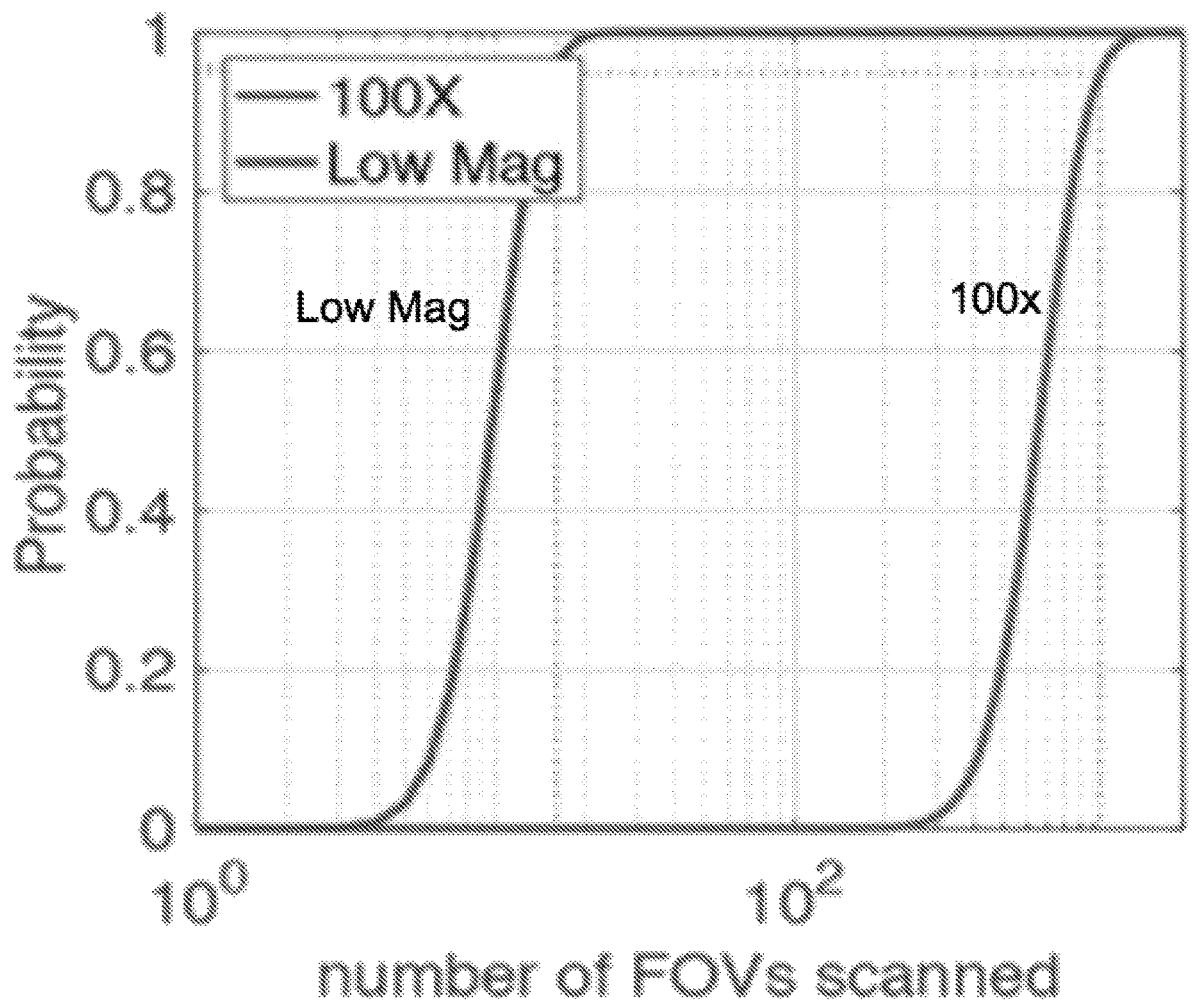

The advantage of automated scanning becomes evident by examining the probability of occurrence of a given number of parasites in scanned fields of view. For a hypothetical parasitemia of 100 parasites/microliter, the probability was plotted of more than 10 parasites being present as a function of number of fields of views scanned for two different magnifications (FIG. 3E). The inventors observed that if enough fields of views were examined, the probability goes to one. Furthermore, in applications where the use of fluorescent dyes and/or pathogen-specific probes renders the morphological features of the detection targets unimportant, or reduces the requirement of optical resolution (such as in detecting DAPI-stained platelets), low magnification can be used in place of high magnification to significantly boost throughput. In the example above, to have at least 10 parasites with more than 95% probability, on average only 16 low mag fields of view are needed, as compared to 1058 fields of views in the case of 100× oil objective. This calculation assumes that all the targets are in the same plane. For targets that are distributed in 3D, such as in sputum sample or in tissue slices, the increase in throughput is even more significant, given the depth of focus of 55 um, 8.8 um, 1.3 um and 0.53 um for 4×/0.1, 10×/0.25, 40×/0.65 and 100×/1.25 oil objectives.

Automated Detection of Malaria Parasites in Thin Blood Smears

Fluorescence microscopy has been used for sensitive detection of malaria parasites. However, the prospect of detection in fixed blood smears at low magnification is hindered by the presence of brightly stained platelets, which are highly abundant (there are typically 250,000 platelets per microliter blood) and appear similarly in size and brightness as malaria parasites. Yet, *P. falciparum* malaria parasites, which have a 48-hour asexual life cycle, contain not only DNA, but also large amount of RNA. This provides an opportunity for differential detection. The emitted fluorescence red-shifts in DAPI-RNA complexes are shown compared to DAPI-DNA complexes, which means that depending on the DNA-RNA ratio cells, overall shift up to about 40 nm can be expected. In fact, this property has been used in enumerating reticulocytes in rodent malaria models. One can readily see the color difference between human platelets and reticulocytes in FIG. 3B, with the latter containing mostly RNA.

Figure 4A:
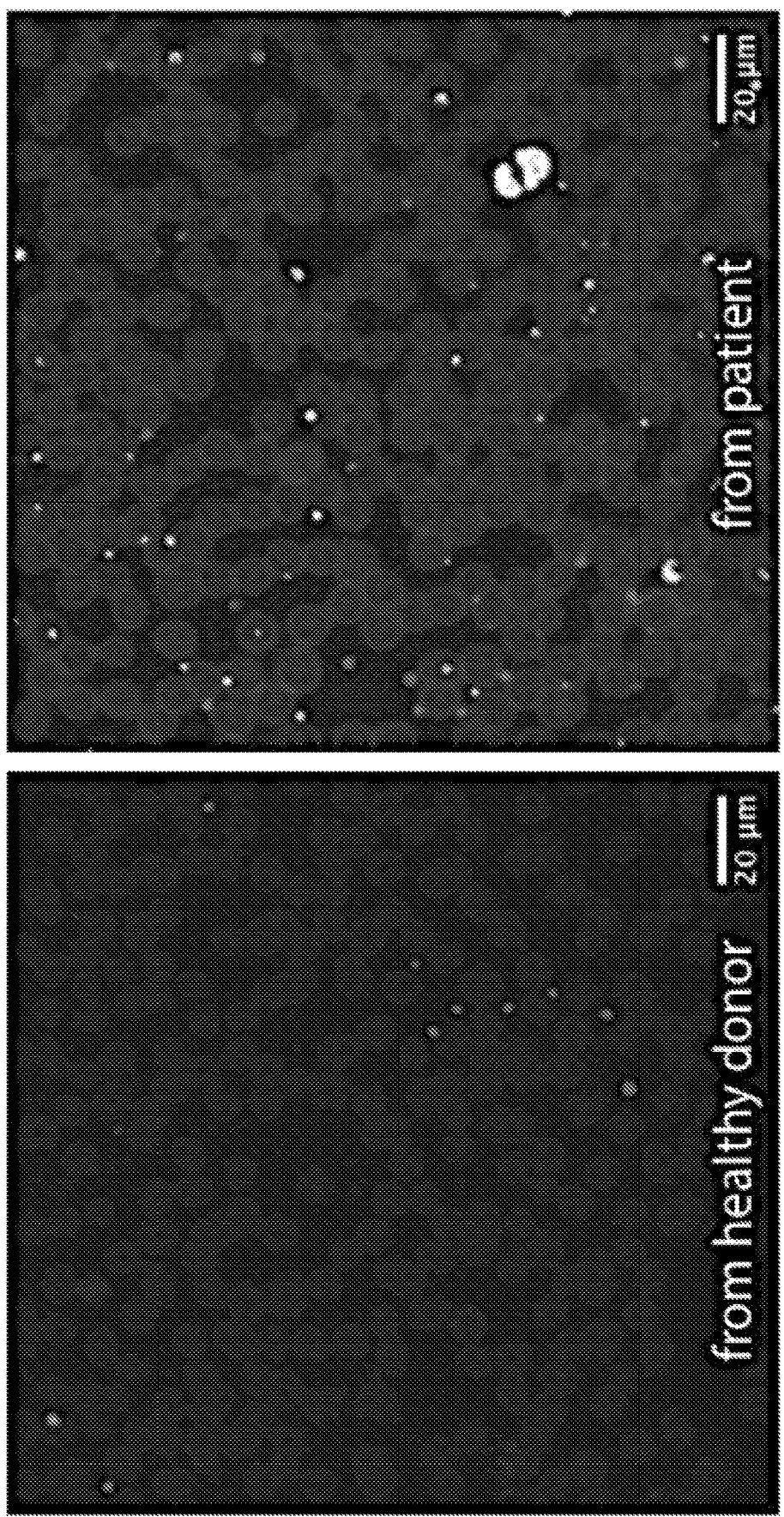
FIGS. 4A-C show examples of spectral shift in DAPI-stained *P. falciparum* parasites according to an exemplary embodiment of the invention.
Figure 4B:
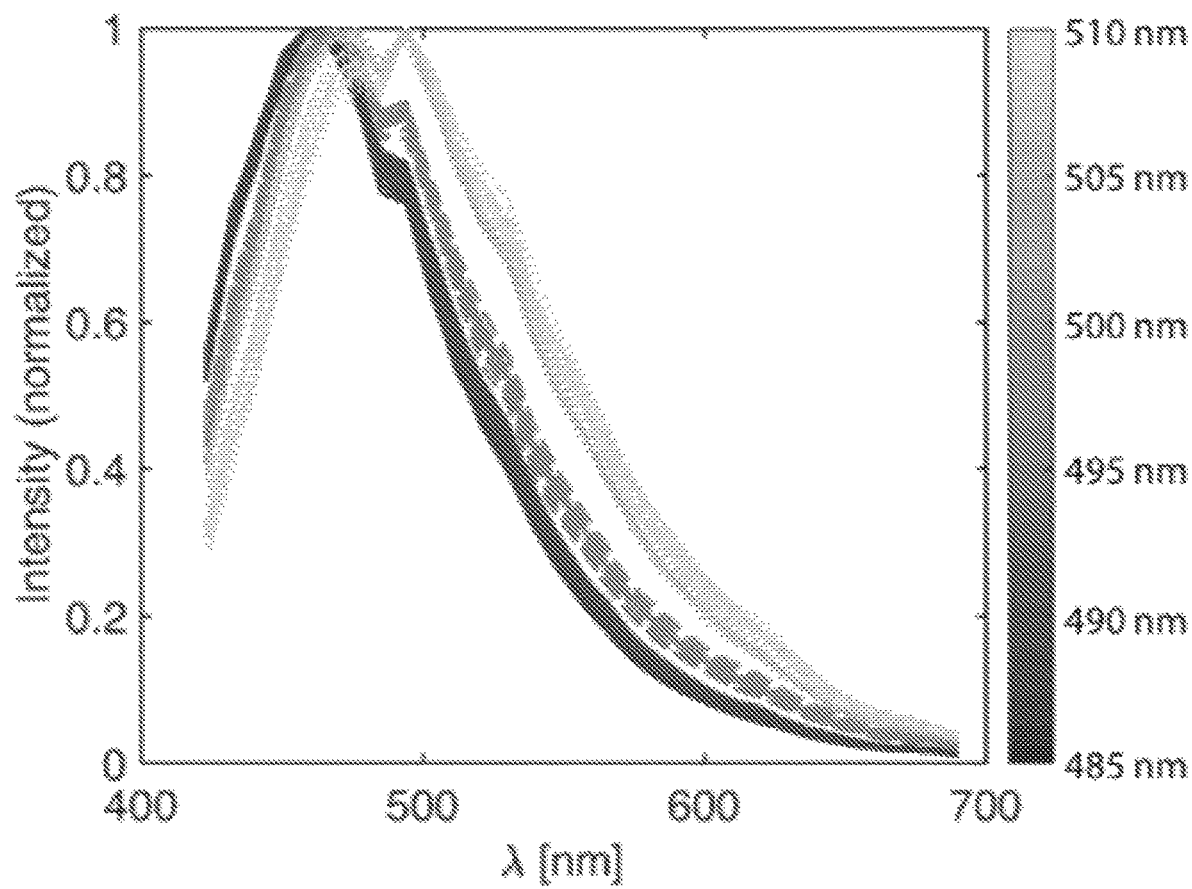
Figure 4C:
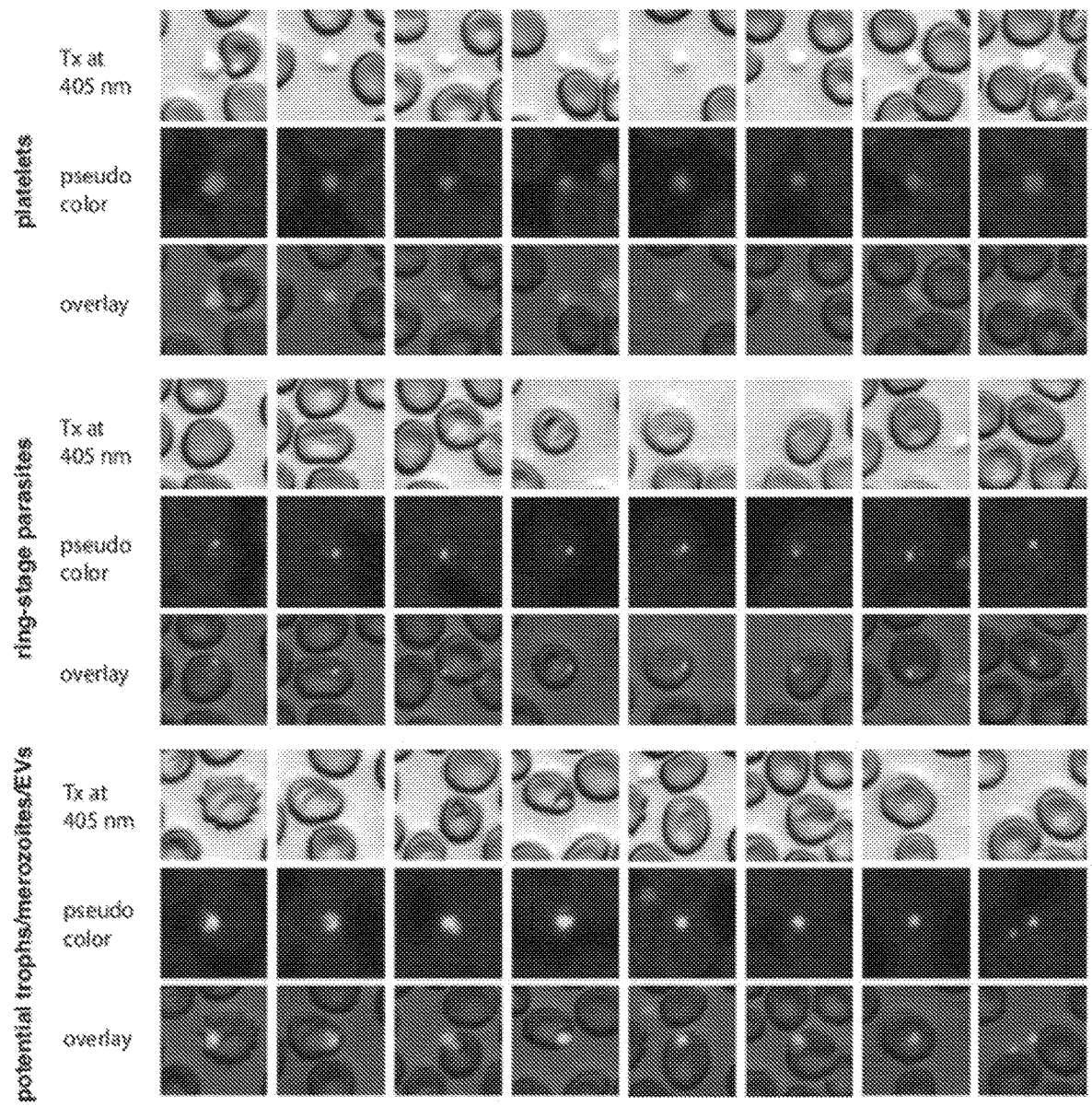

To support the feasibility of differentiating malaria parasites from platelets based on DNA/RNA ratio and its associated spectral shift, smears of blood from healthy individuals and patients diagnosed with malaria were imaged with laser scanning confocal microscopy where spectrum at each pixel is recorded. The results revealed a spectral red shift on the order of 10 nm for ring-stage *P. falciparum* parasites. For better visualization of the results, the obtained 32-channel spectral stacks were mapped to pseudo color images (FIG. 4A), where the color is determined by centroids of the spectrum, with purple being 485 nm or below and yellow being 510 nm or above. Using the same color code, the spectrum of selected spots was plotted (FIG. 4B), where three clusters emerge. Examining the spots (FIG. 4C) the inventors concluded that the first purple/dark blue cluster (centroid below 495 nm) corresponds to platelets, and that the second green colored cluster (centroid at 495-500 nm) belongs to ring-stage malaria parasites. Because of the absence of distinctive morphological features, the identity of the third cluster where the "yellow" spectrum originates (centroid above 505 nm) remain to be determined. Likely candidates for the brighter "yellow" spots include merozoites and trophozoites stages of the *P. falciparum* parasites, as these stages can be stained intensively with RNA-selective dyes. As they're not observed in uninfected blood, dimmer "yellow" spots can be accounted for by parasites-derived extracellular vesicles, which have been reported to contain RNA and DNA.

Figure 5A:
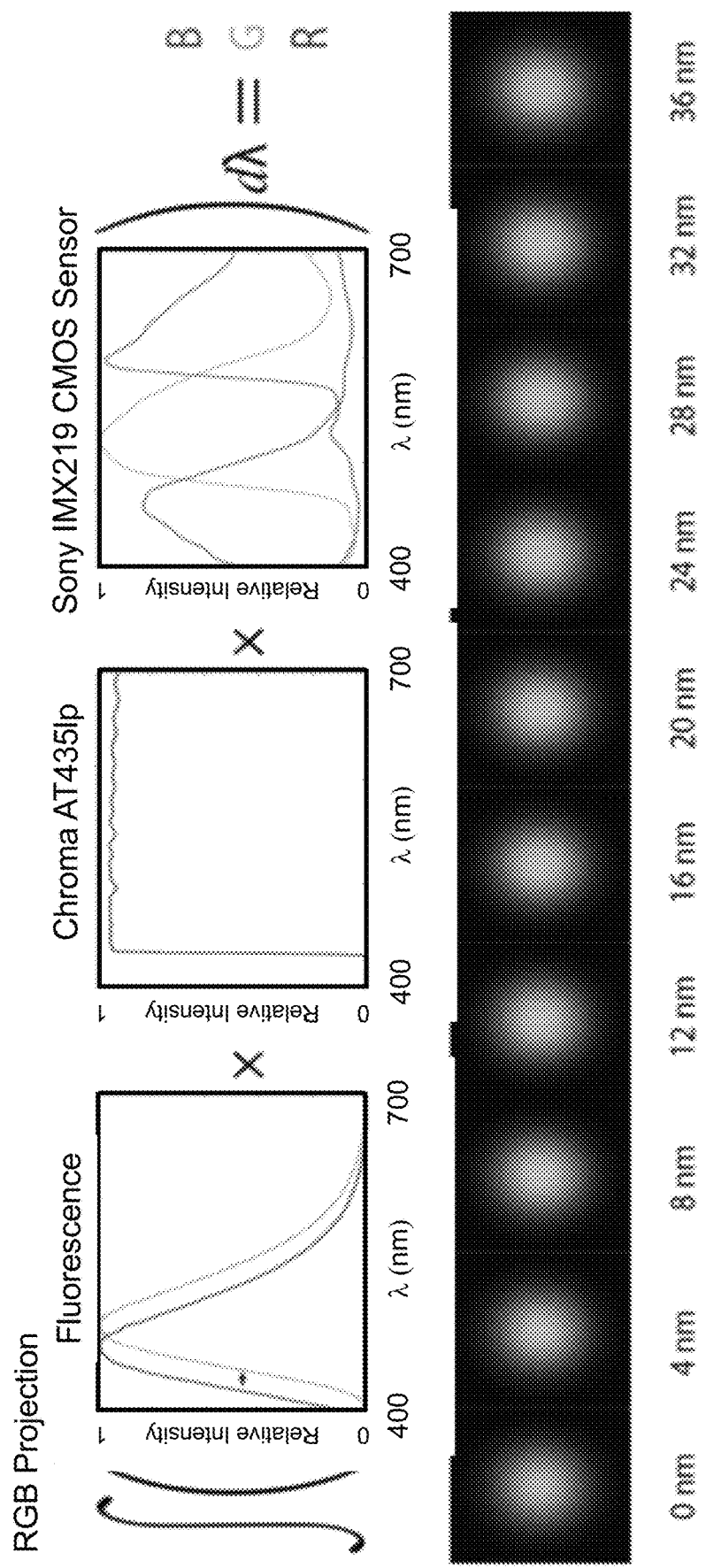
FIGS. 5A-B show simulation of three channel spectral imaging with an RGB CMOS sensor according to an exemplary embodiment of the invention.
Figure 5B:
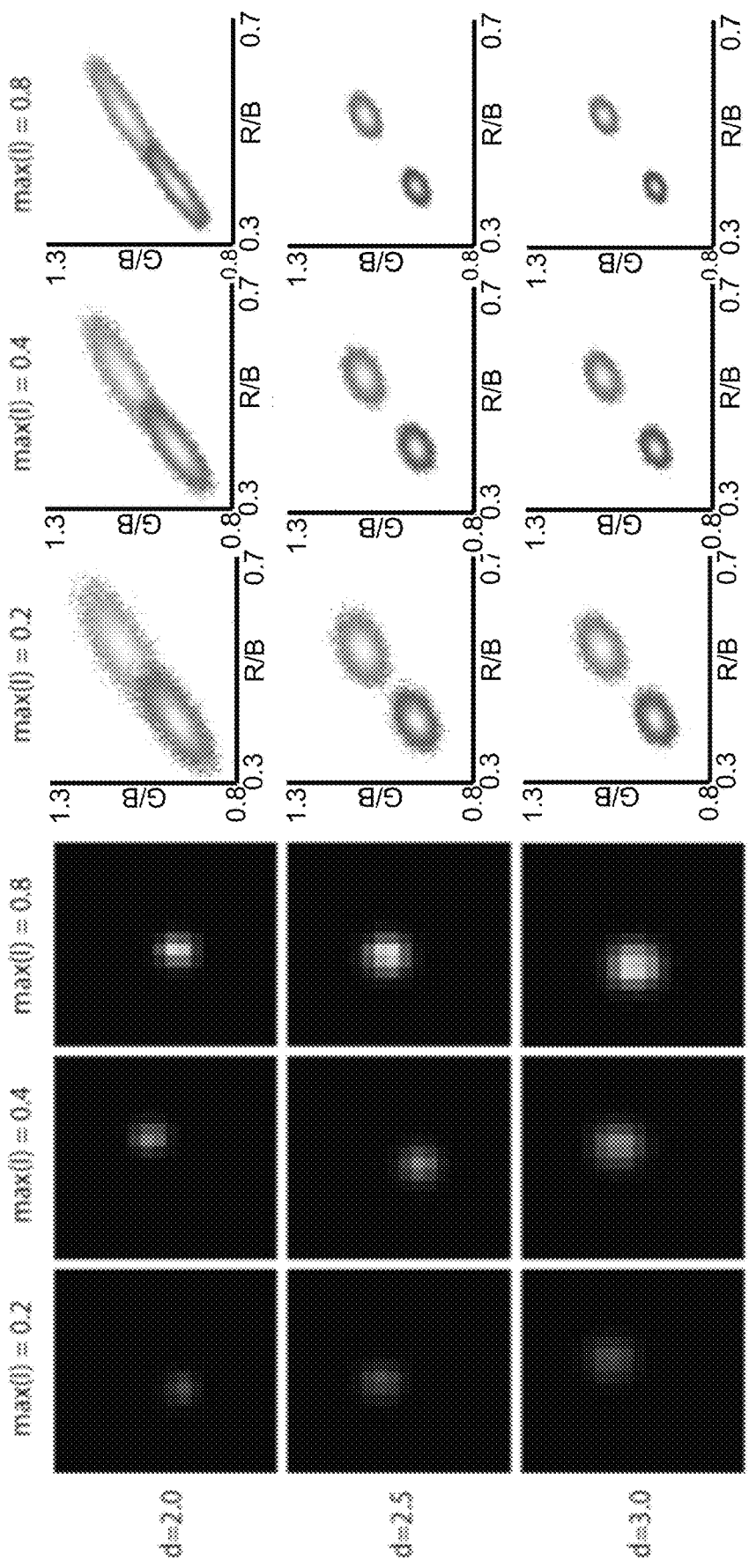

Traditionally, fluorescence microscopy is done with monochrome cameras and band pass filter with relatively narrow pass band for better sensitivity and background suppression. However, in doing so, spectral multiplexing will involve use of multiple filters or point spread function engineering, which adds to the complexity of the system. In this invention by utilizing a long pass filter and a color CMOS sensor where color filter arrays in the Bayer arrangements are directly integrated on top of the pixels, the inventors were able to obtain spectral information in a single shot. To quantify the performance of this setup, the spots were simulated with spectrum from the average of DAPI-stained platelets and DAPI-stained ring-stage parasites (FIGS. 5A-B). In the simulation, spots were assumed to have a Gaussian profile, and both finite pixel size and photon shot noise were considered. To get a lower-dimensional representation, the spots are then projected to normalized color space G/B vs R/B, where R/B is the ratio of total red pixel intensity and total blue pixel intensity, and similarly G/B is the ratio of total green pixel intensity and total blue pixel intensity. Intriguingly, for spot sizes and signal levels easily achievable, spectral shift as low as 8 nm can result in good separation in the G/B vs R/B space.

Figure 6A:
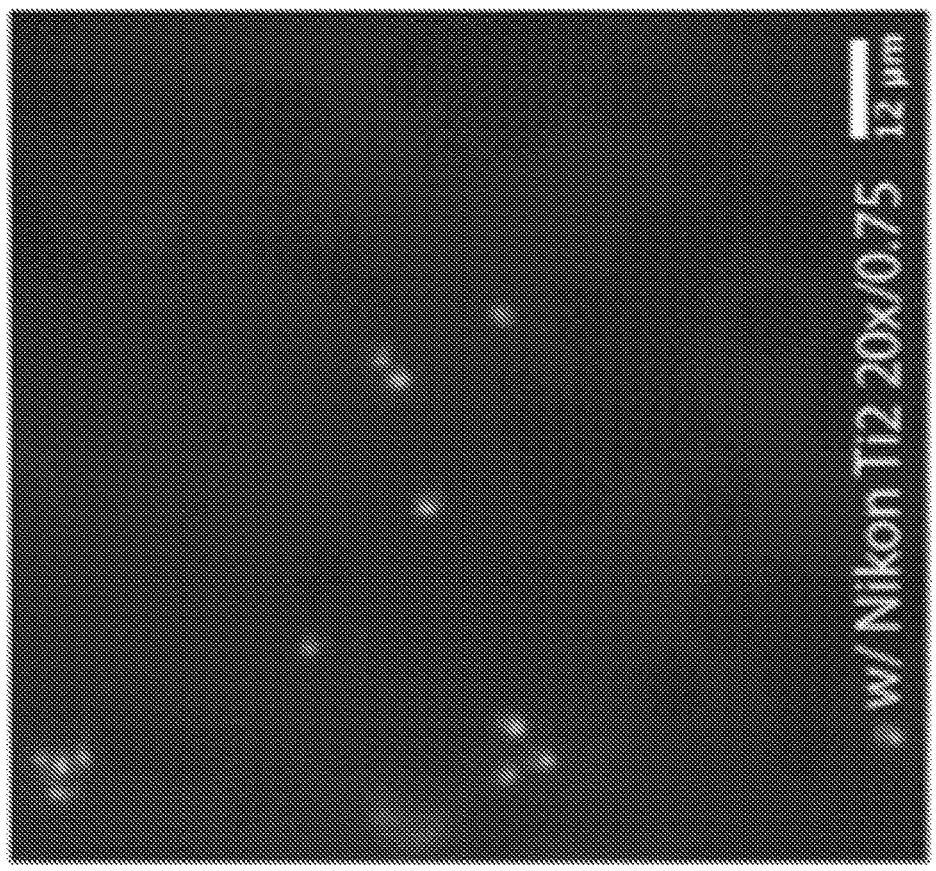
FIGS. 6A-E show high throughput *P. falciparum* parasites detection at low magnification according to an exemplary embodiment of the invention.
Figure 6A:
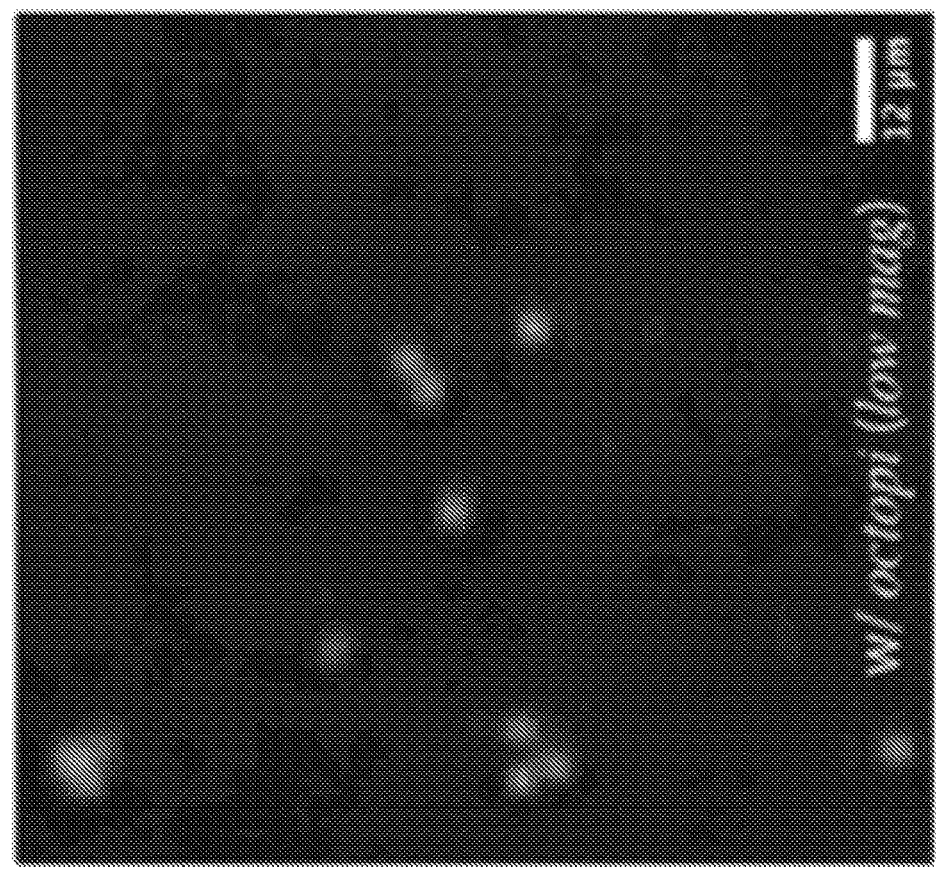
Figure 6B:
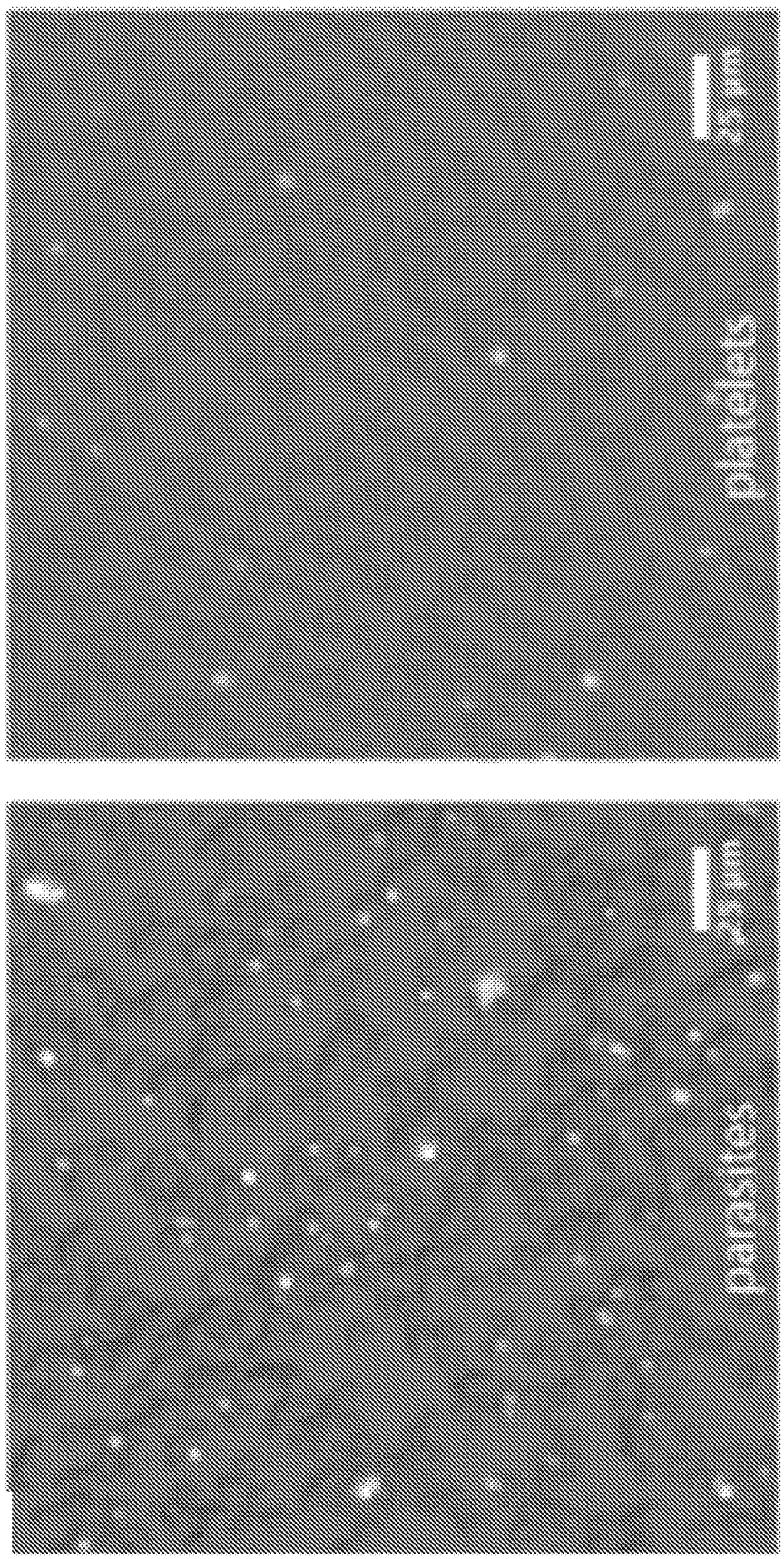
Figure 6C:
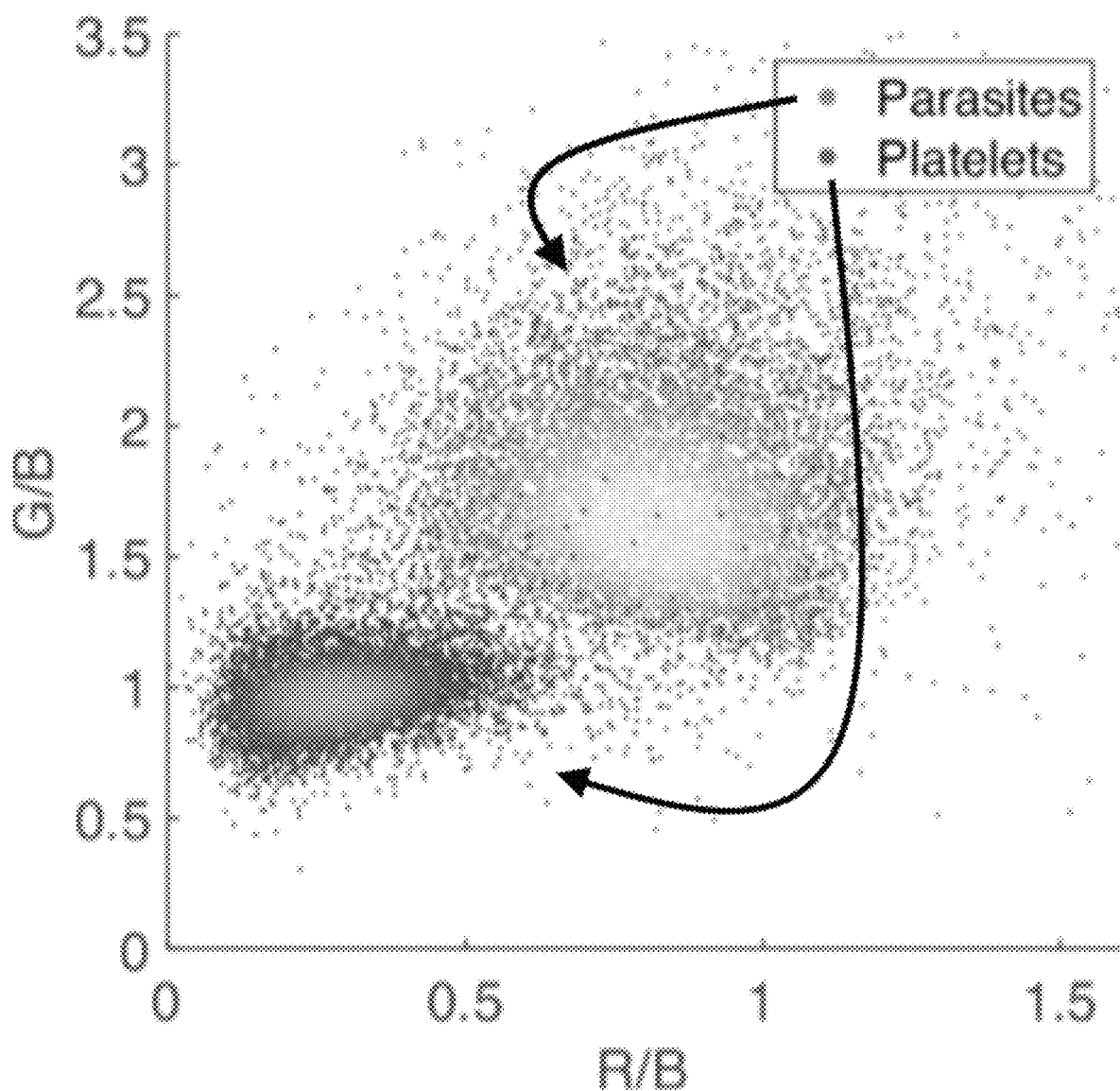

To show that the imaging platform configured with the low mag imaging module has enough sensitivity for detecting DAPI-stained ring-stage parasites, the same smear of *P. falciparum* culture was imaged on Octopi and on a high-end research microscope (Nikon Ti2 with Prime 95B sCMOS sensor), and one-to-one correspondence of fluorescent spots can be observed (FIGS. 6A-B) compares a typical overlaid bright-field and fluorescent field of view of *P. falciparum* culture with that of uninfected whole blood, and the color difference between parasites and platelets can be appreciated. To quantify how well parasites and platelets may be told apart, 8 smears of *P. falciparum* culture and 10 smears of uninfected whole blood were stained and imaged, where a total number of 109,355 fluorescent spots from the *P. falciparum* culture and 437,944 fluorescent spots from the uninfected whole blood were detected and extracted using the aforementioned processing pipeline. Projection of randomly selected 10,000 spots into the G/B vs R/B space is plotted in FIG. 6C. Good separation in this scatter plot suggests and that color, as a manifestation of spectral shift, is a robust feature for distinguishing parasites from platelets. The results also suggest the absence of confounding objects in uninfected whole blood.

Figure 6D:
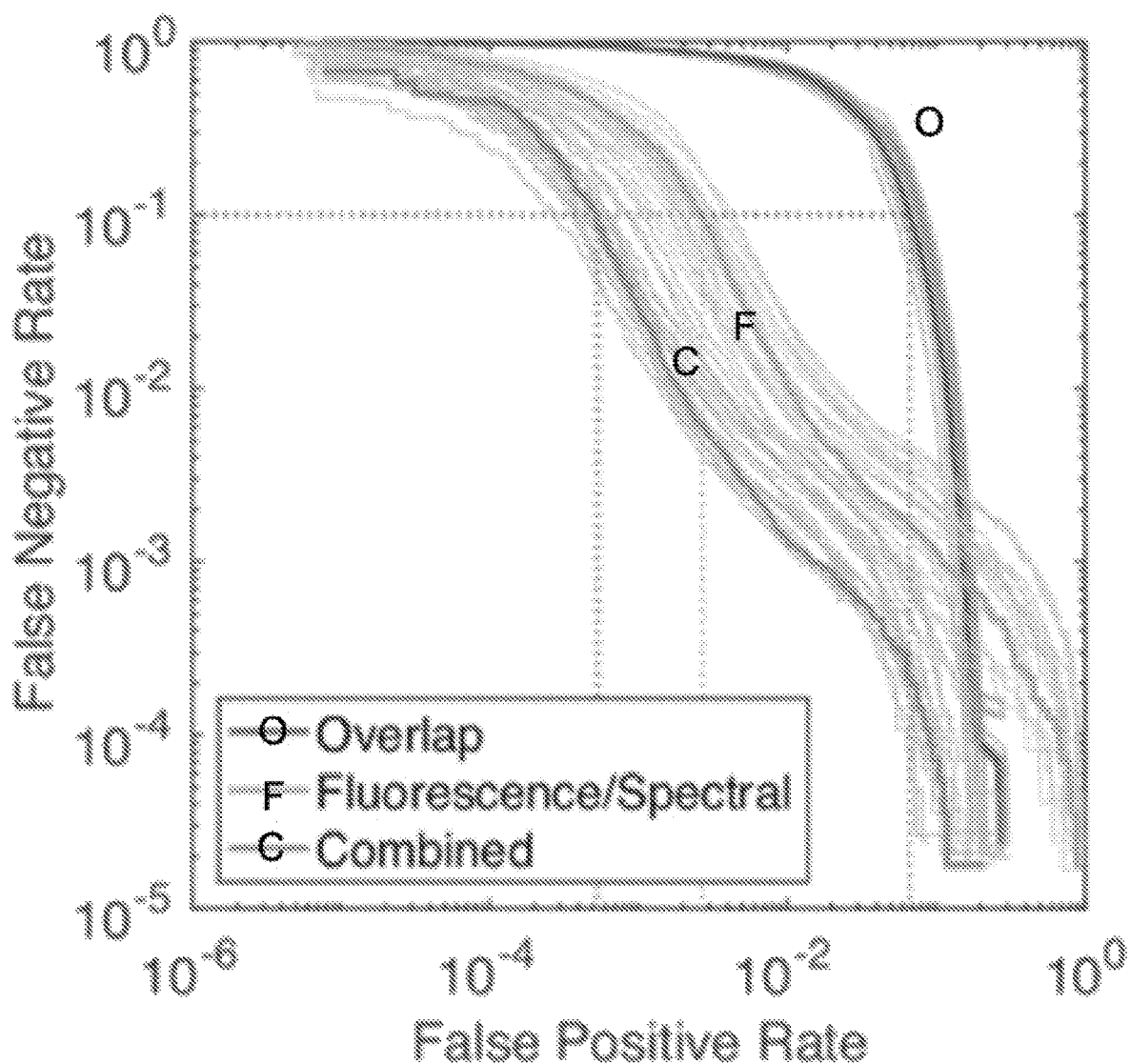
Figure 6E:
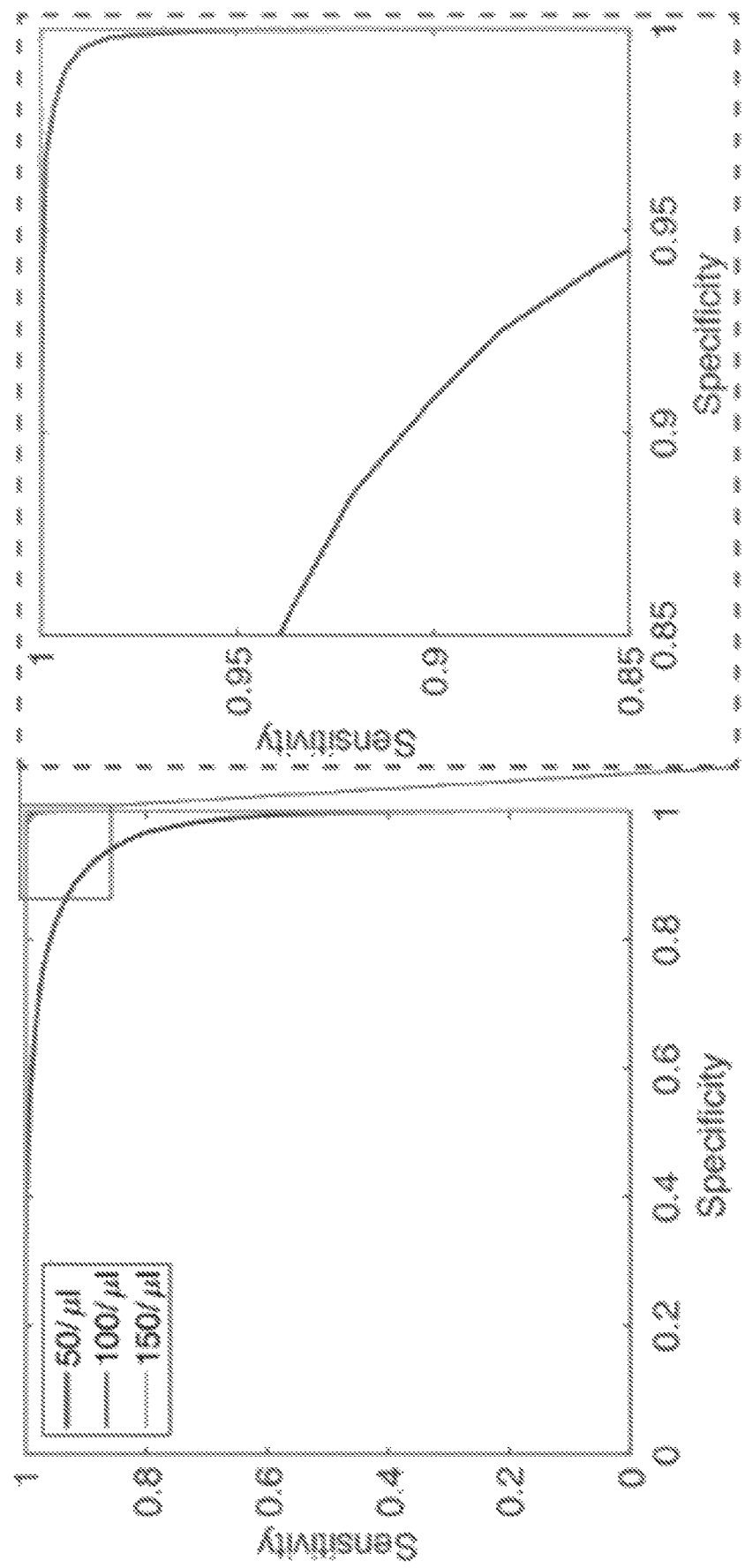

To automatically detect parasites from extracted spots and obtain diagnostic performance that can be expected with the herein provided solution, a boosted-tree classifier was built that takes features from each extracted spots and outputs a class label. The performance of the classifier can be characterized by its False Positive Rate (FPR) and False Negative Rate (FNR), where FPR is the number of platelets misclassified as parasites over the total number of platelets and FNR is the number of parasites misclassified as platelets over the total number of parasites. The inventors found that using combined features from bright-field images and fluorescent images result in the best classification performance (FIG. 6D). Specifically, at FNR of 10%, FPR of 0.05% (average of 20-fold cross validation, range is 0.027%-0.11%, standard deviation is 0.019%) can be achieved. Because both declaration of a smear as negative and quantifying parasitemia in the case of low parasitemia involves scanning a large area and counting a large number of cells, and that brightly-stained platelets are highly abundant, it's important to choose a decision threshold that gives relatively small per spot FPR. This lowers the chances of misdiagnosing an uninfected case as infected and only has a weak negative influence on sensitivity. With per spot FPR=$5 \times 10^{-4}$ and FNR=11%, obtained through Monte Carlo simulations anticipated (per case) sensitivity and specificity of (91%, 91%), (99%,99%) and (100%,100%) for parasitemia of 50/microliter, 100/microliter and 150/microliter (FIG. 6E). This simulation assumes platelet count of 250,000/microliter, all platelets being brightly labeled and that 0.5 microliter blood is screened. In the Jetson Nano-based implementation, the time it took from slide being loaded to an answer (including parasitemia, in the case of infection) can be less than 2 minutes.

Figure 7A:
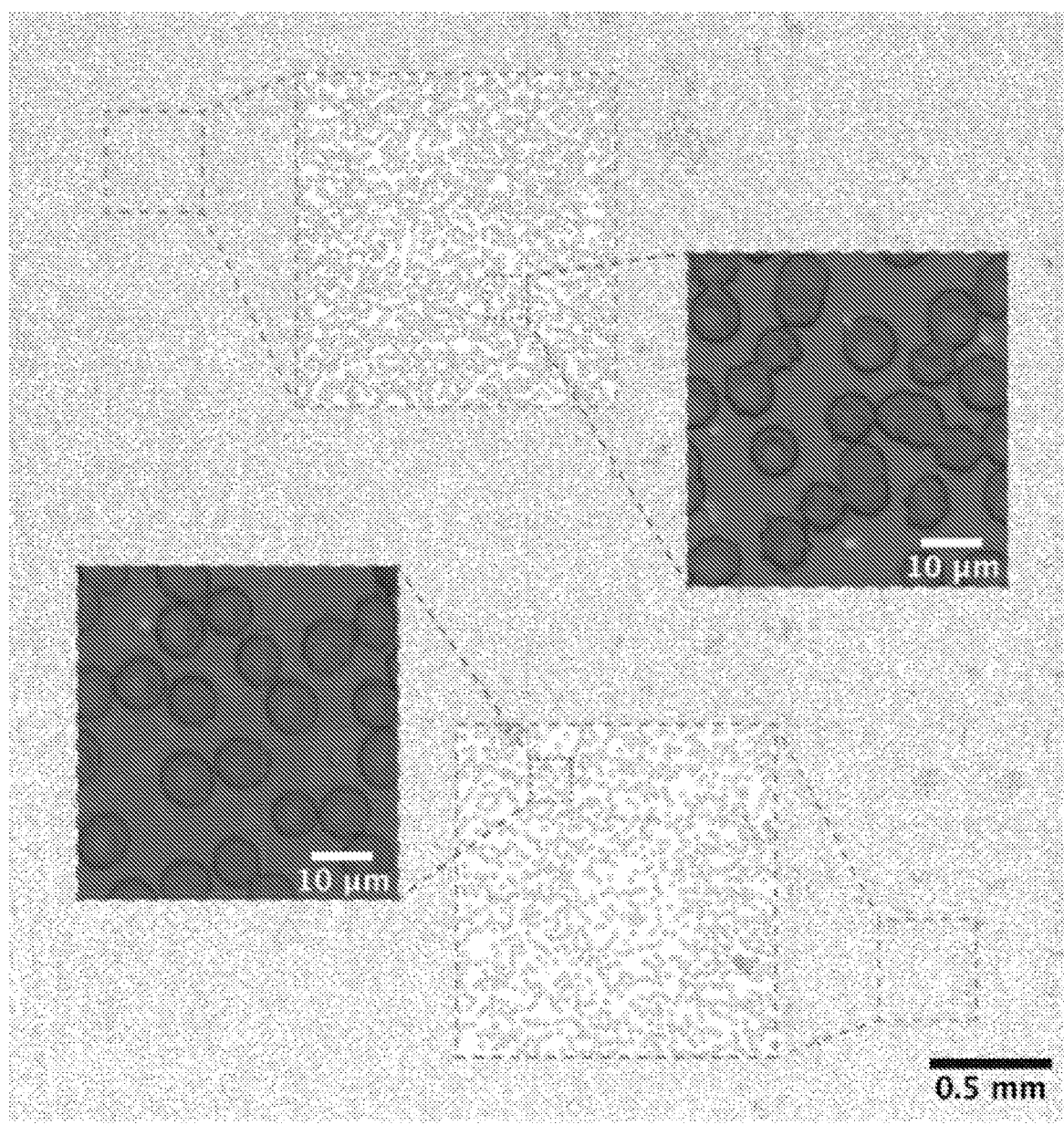
FIGS. 7A-C show imaging blood smear with the high mag imaging module according to an exemplary embodiment of the invention.
Figure 7B:
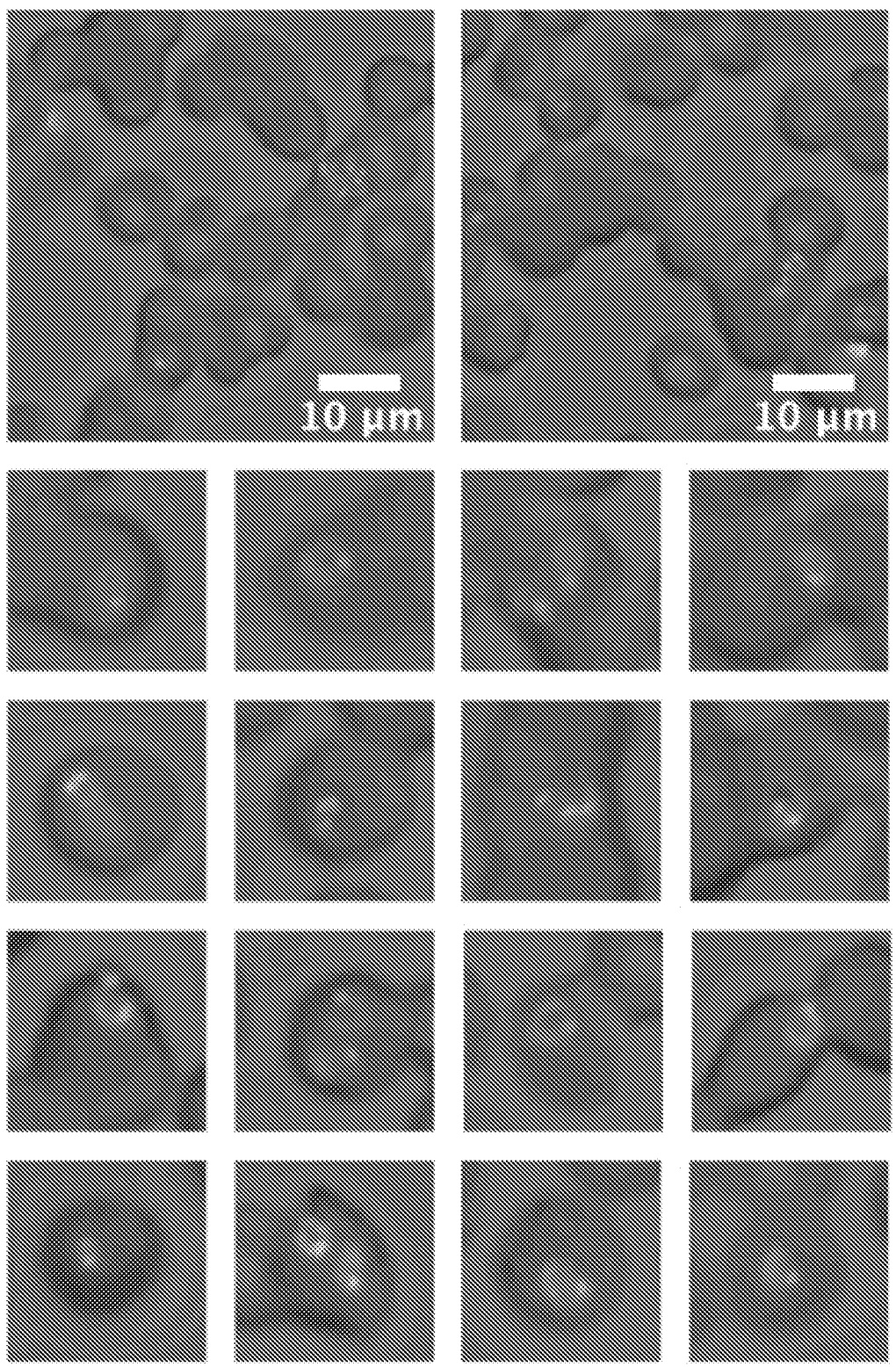
Figure 7C:
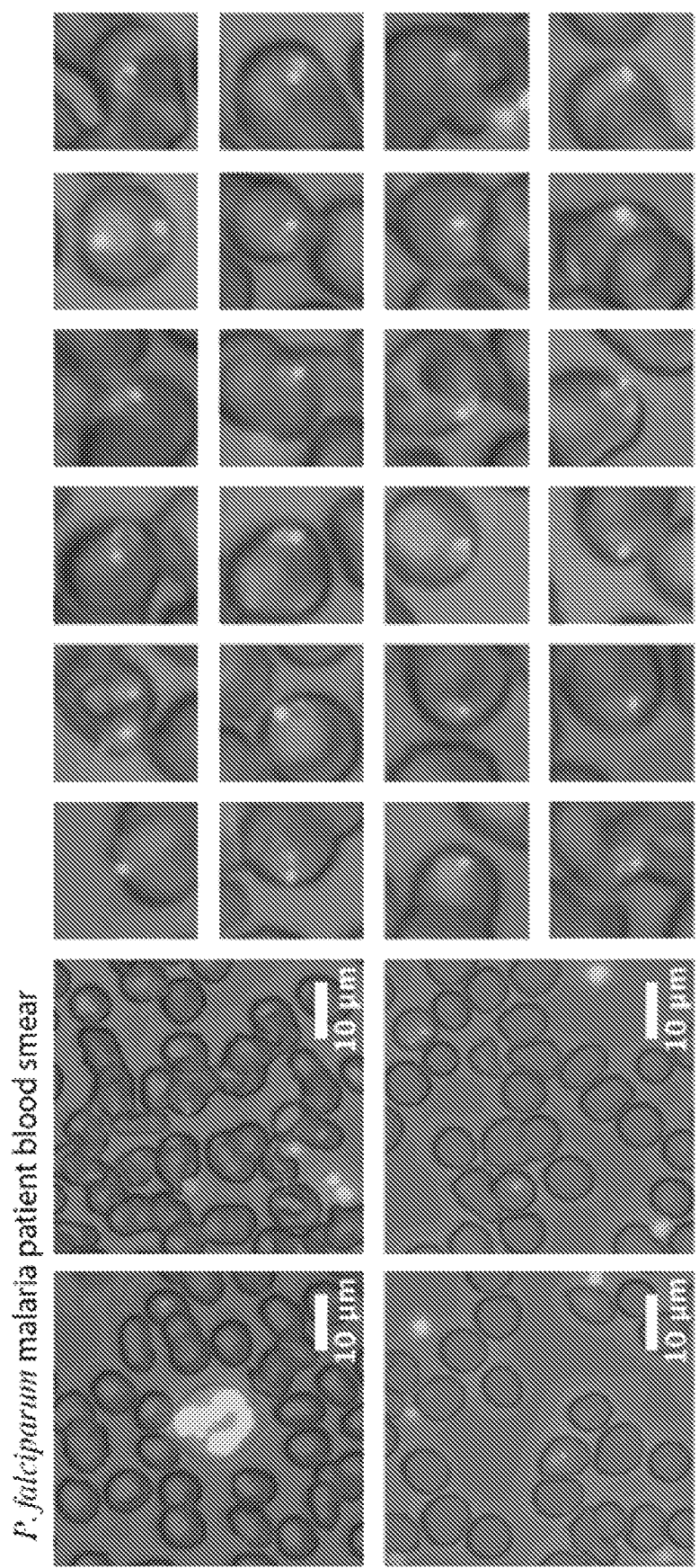

In certain cases, it may be desirable to resolve the morphology of individual parasites. This would further improve sensitivity and specificity, especially for cases with very low parasitemia. This is made possible on the modular platform by using the high mag imaging module with a 40×/0.65 objective. Smears of uninfected whole blood were imaged (FIG. 7A), lab culture of *P. falciparum* (FIG. 7B) and blood samples from patients diagnosed with malaria (FIG. 7C). The result show that with morphology and/or color, parasites can be easily told apart from platelets. Images of lab *P. falciparum* culture also confirm that many parasites are indeed in their ring-stage, with presence of multiple infections, which is due to the high concentration of parasites in the lab culture.

Other Diagnostics Applications

Figure 8A:
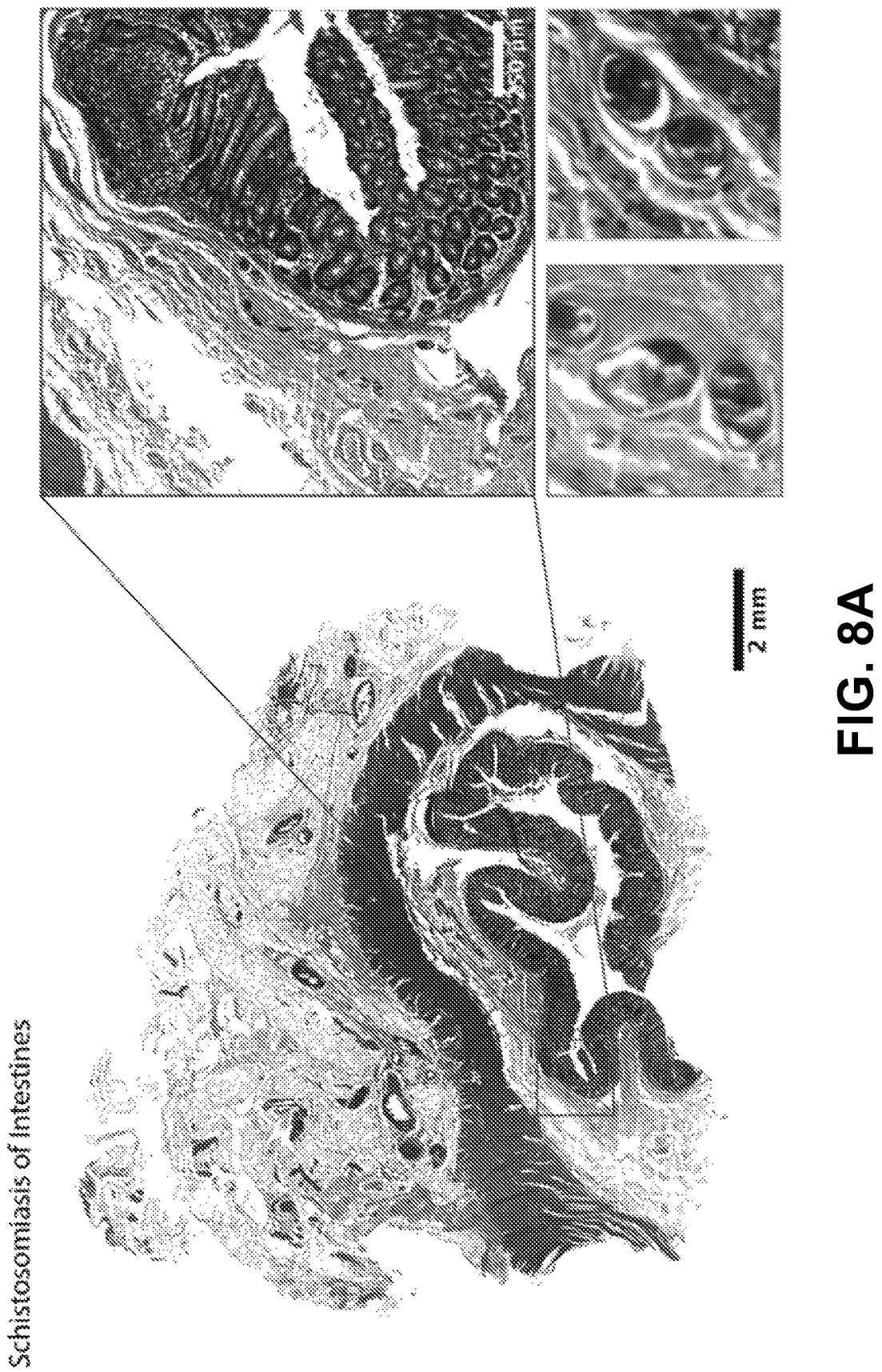
Figure 8B:
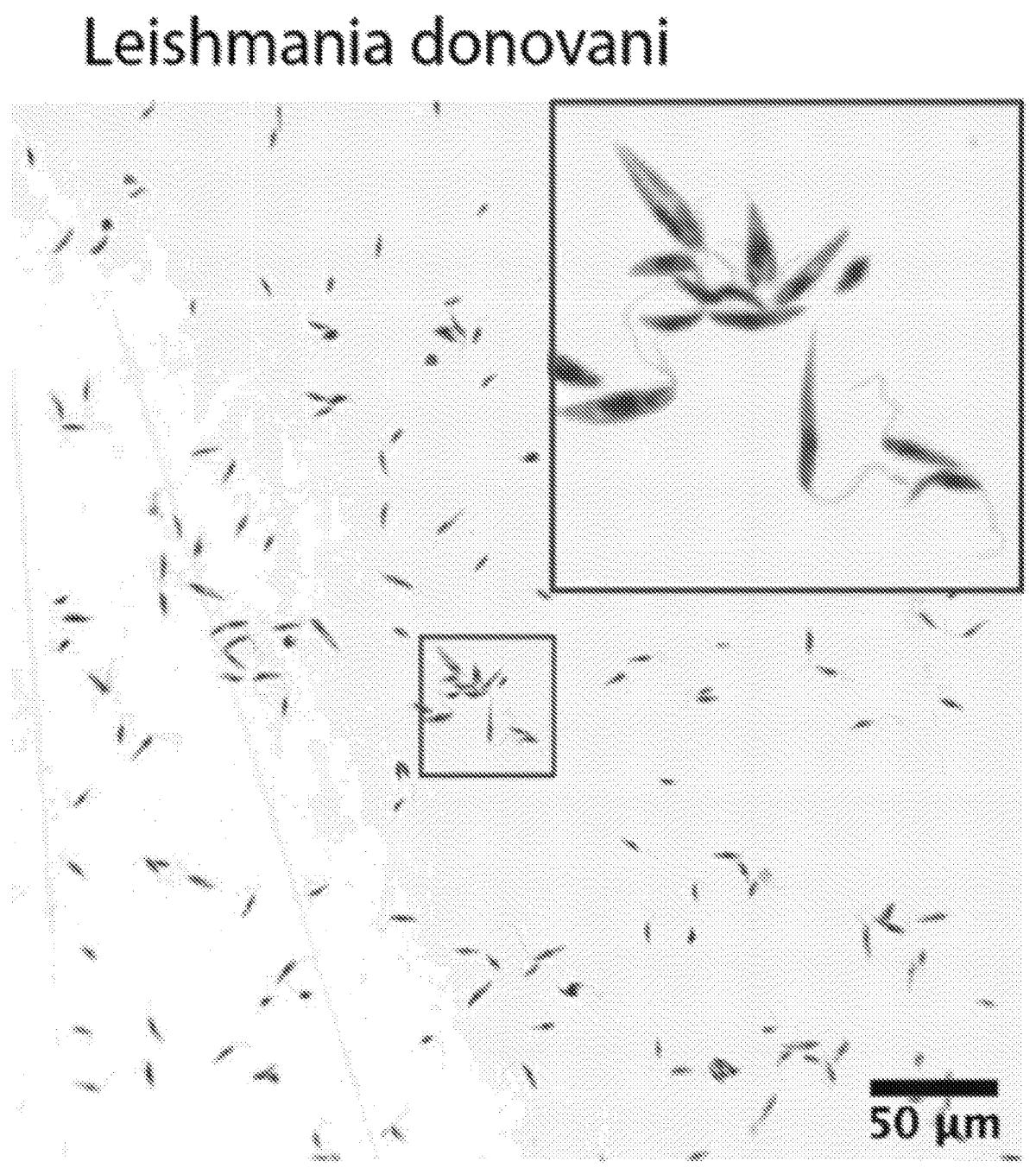
Figure 8C:
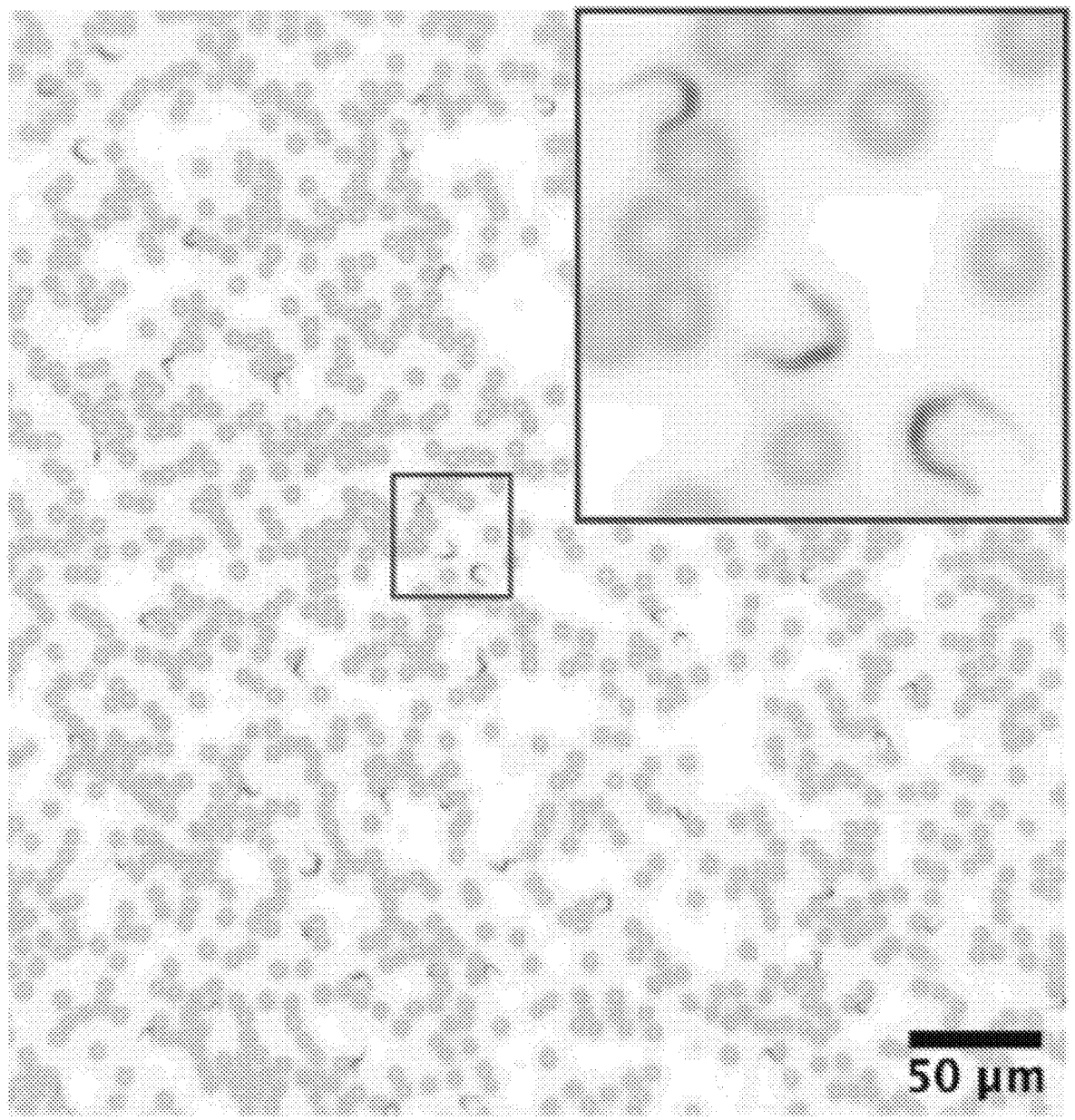
Figure 8D:
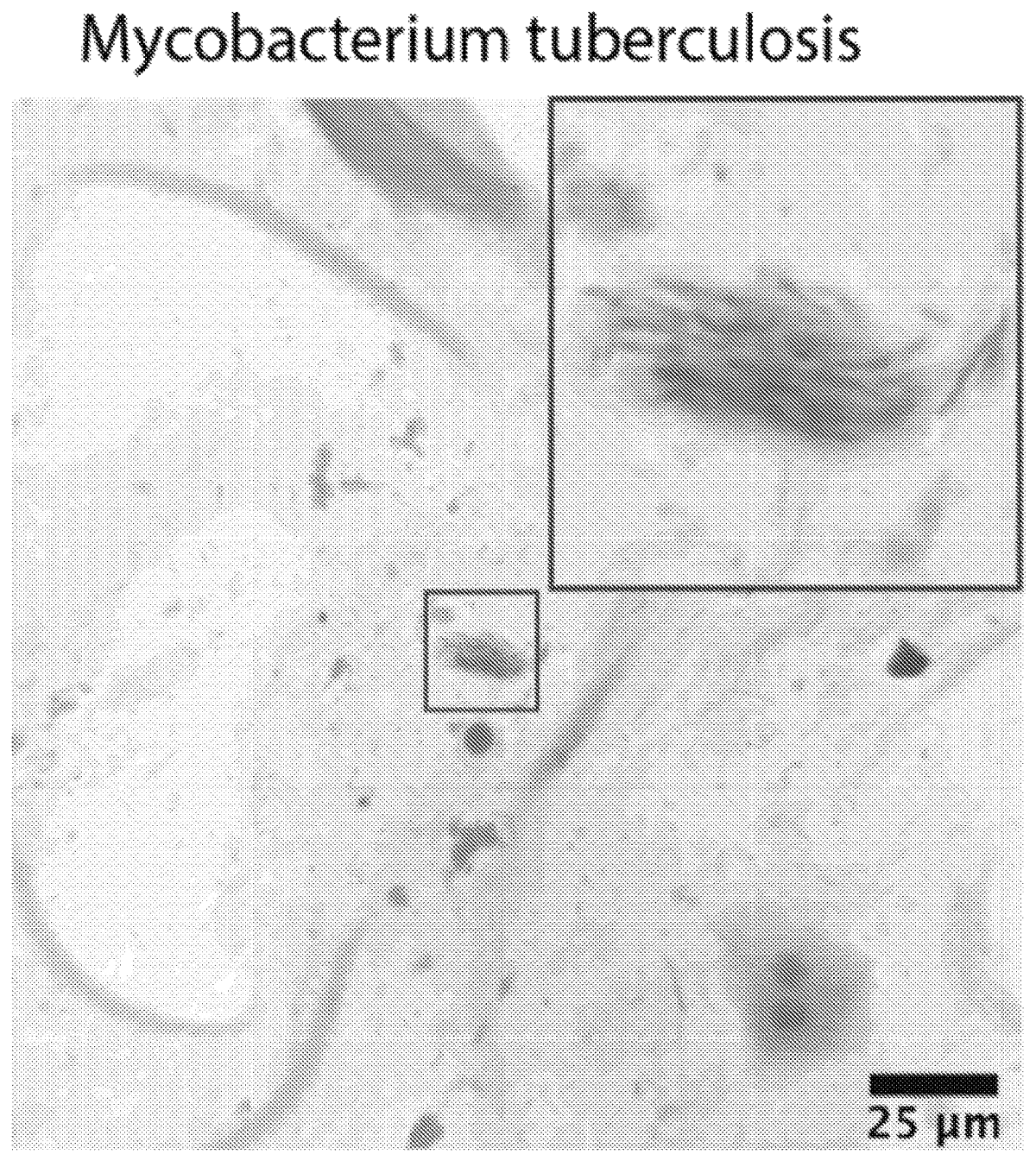
Figure 8E:
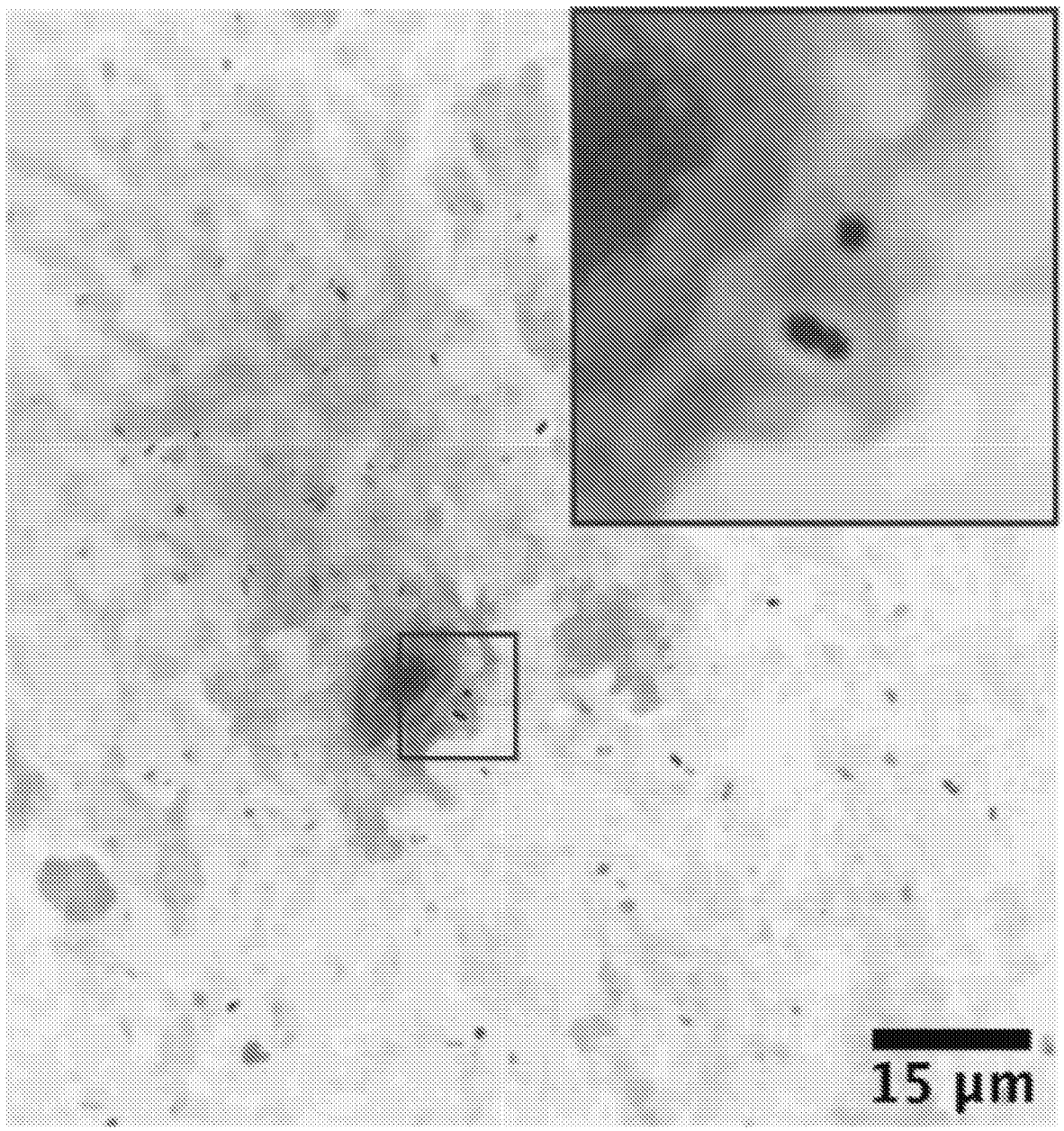
Figure 8F:
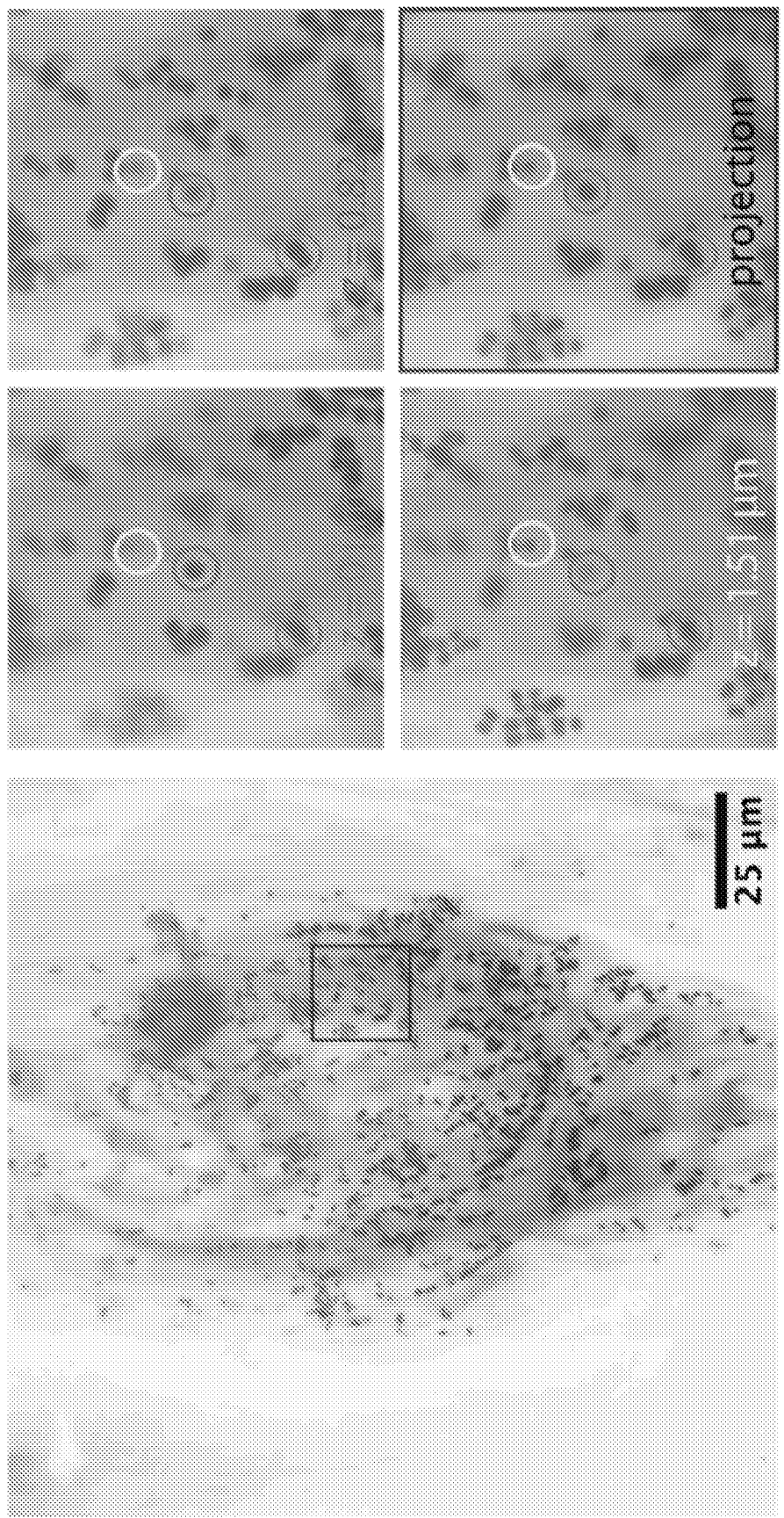

Besides malaria, Octopi can be used to image a wide range of pathogens and conditions. As examples, the inventors images Schistosomiasis of human intesines tissue specimen (FIG. 8A), *Leishmania donovani* that causes leishmaniasis (FIG. 8B), *Trypanosoma brucei* rhodesiense (FIG. 8C) that causes African sleeping sickness, *Mycobacterium tuberculosis* that causes tuberculosis (TB) (FIG. 8D), *Streptococcus pneumonia* that can cause community-acquired pneumonia (CAP) (FIG. 8E) as well as *Staphylococcus aureus* that can cause bacteremia, skin infection, respiratory infections and food poisoning (FIG. 8F). The last three bacterial pathogens were in sputum samples and imaged using the high mag imaging module with a 100×/1.25 oil immersion objective. In the last sample, since the bacteria are distributed in different z-plane, a z-stack was taken to capture all within the field of view.

Materials and Methods

Study Design

One of the goals of this invention was to develop and evaluate a low-cost, modular and automated microscope platform for a range of applications including, in particular, diagnosis of infectious disease with high throughput in resource-limited settings. The inventors started by implementing modules of the microscope and characterizing their performances, showing that performance comparable to high end research grade microscope can be achieved. In applying the platform to detection of ring-stage *P. falciparum* parasites, the inventors discovered that with 405 nm laser excitation, a 435 nm long pass emission filter and a color CMOS camera, DAPI-stained parasites and platelets may be told apart by color. The inventors used laser scanning confocal microscopy to obtain spectrum of emitted fluorescence from DAPI stained platelets and parasites in patient sample, which revealed a spectral red-shift on the order of 10 nm. That this shift and the resulting color difference can be used to differentiate parasites and platelets under low magnification was supported by simulation. To automatically detect parasites and quantify diagnostic performance that may be achieved, the inventors collected data from 8 smears of *P. falciparum* culture and 10 smears of uninfected blood and trained a classifier using these data. This amounts to baseline data on 109,3555 spots of parasites (*P. falciparum*) and 437,944 spots for uninfected whole blood. Based on this classifier sensitivity and specificity was simulated that can be expected at different parasitemia. A processing pipeline was implemented on Jetson Nano so that computation can be performed locally in real time. Furthermore, the inventors imaged lab and patient samples on the platform with high magnification to show that morphology of ring-stage parasites can also be resolved, implying further improved sensitivity and specificity can be achieved. Finally, to show broad applicability of the platform, different prepared pathological samples with different magnifications were imaged.

Construction of the Microscope

Custom parts of the microscope were designed with Autodesk Inventor Professional and fabricated by Protolabs and 3D Hubs (CNC machining with 6061 Aluminum), and Fictiv (selective laser sintering with Nylon). In the high mag imaging module, a piezo stack actuator with end cap (Thorlabs PK2FMP2) was epoxied to the extended contact ball bearing linear stage (SELN LBV40-C2). A 12-bit DAC (Adafruit MCP4725 breakout board) was interfaced with the Raspberry Pi computer through I2C interface. The output of the DAC was amplified by a miniature piezo driver (PiezoDrive PDu100B) to drive the piezo stack actuator. Three stepper motor driver boards (Allegro A3967-based Easydriver) were used to drive the lead screw linear motors and captive linear actuator (Haydon Kerk Pittman 21H4AC-2.5-907).

Scanning Stage Flatness Characterization

A LabView program was developed to raster scan a target slide (Ossila S151 Ultra-flat Quartz Coated Glass) while recording the relative z-position of top surface of the slide at the center of the microscope field of view, which is measured by a non-contact displacement sensor (MKS Instrument Optimet ConoPoint-3R). The measurement results were saved as CSV files and processed with MATLAB.

Deep Learning-Based Red Blood Cell Segmentation

The 91-layer Fully Convolutional DenseNet contains 11 dense blocks (with 4, 5, 7, 10, 12, 15, 12, 10, 7, 5 and 4 layers for each block), and was trained from scratch. Weights of the convolutional layers were initialized using He initialization. For training, Adam optimizer was used with a learning rate of 0.001 and batch size of 16.

To deal with the more frequent false negatives (RBC pixels labeled as non-RBC pixels) compared to false positives (non-RBC pixels as RBC pixels) in the labels of the training data, class weights were introduced in the binary cross-entropy loss function. Specifically, false negatives were associated with a class weight of 10, whereas false positives were associated with a class weight of 0.1. This ensured that mispredictions made on pixels labeled positive, where labels are reliable, are penalized more heavily than mispredictions made on pixels labeled negative, where labels can be noisy.

To obtain a large labeled training data set without tedious human annotation, the following two-step approach is taken. First, Hough transform was used to generate accurate segmentation masks for images where red blood cells are round and isolated. Second, multiple such images were superimposed and distorted through shear transformations to mimic images with red blood cells that are not round and/or overlapping. The resulting images, which also have accurate masks, were used to augment the training data. In total, 22,680 images of size 128×128 were used for training the neural network.

Spot Detection from Fluorescent Images Obtained with the Low Mag Imaging Module

Two spot detection pipeline was implemented. The CPU-only pipeline (pipeline A) was implemented in python with the scikit-image package. The pipeline that takes advantage of CUDA (pipeline B) was implemented in C++ with the OpenCV library and python with the scikit-image package. Both pipelines take an image of size 1428×1428×3 as input and convert it to grayscale for further processing. In pipeline A, functions skimage.morphology.white_tophat and skimagefeature.blob_log are used. In pipeline B, image is uploaded to GPU and background removed using tophat filtering with disk diameter of 9. The processed image remains in GPU and is converted from CV_U8 to CV_F32. Four normalized Laplacian of Gaussian images (LoG1, LoG2,LoG3,LoG4) with gaussian sigam equal to 1, 1.5, 2 and 2.5 are computed by applications of a Gaussian filter followed by a Laplacian filter and scale normalization. The four images are compared with a manually selected threshold, and pixel whose value is smaller than the threshold is set to zero. A maximum projection along the scale dimension of the four LoG images is computed and and a 3×3 maximum filter is applied. The resulting image (P) is compared with the four LoG images, and locations where pixel values equal are recorded in a mask M initialized with zeros (for example, if LoG 3(r,c)==P(r,c), then M(r,c) is set to 3). The mask, which stores locations of 3×3×4 local maximums, is downloaded from GPU, and 3D coordinates (2D location+scale) of non-zero elements of the mask are exported as a three-column array. The array is loaded in python for removal of spots with overlap exceeding a set threshold of 0.5. The last step takes advantage of the already implemented skimage.feature.blob._prune_blobs function, which uses a KDtree implemented in c to perform nearest neighbour search for significantly reducing the number of pairwise comparison needed.

Before passing to the spot detection processing pipeline, fluorescent images were first converted from sRGB space to linear RGB space, so that pixel intensity has a linear relationship to the number of photons collected. Detected spots were saved for visualization and downstream classification.

Fluorescent Spot Classifier

The gradient boosted decision trees classifier was implemented using XGBClassifier from the xgboost python package. Features for each fluorescent spot passed as input to the classifier and their relevance. Among the features, overlap is the sum of pixel values of pixels that are segmented as part of red blood cells over the sum of pixel values of all pixel. For uninfected whole blood, this feature is directly computed from data. For $P.$ falciparum culture, because the red blood cells are ill-shaped for bright field segmentation, this feature was sampled from an empirical distribution. Performance of the classifier was measured using 20-fold cross validation. Each fold is made of 3 smears of uninfected whole blood slides and 3 smears of $P.$ falciparum lab culture, picked at random. For training the classifier, binary logistic loss function was used with a L2 regularization term.

Image Processing

For all the images presented, image processing was done in MATLAB. For brightfield images, illumination correction is done through normalization against a blank image (image of a blank slide). For fluorescent images, background removal is done through tophat transform. Bright field images from both the low mag imaging module and the high mag imaging module and fluorescent images from the high mag imaging module are demosaiced in MATLAB from the raw bayer data. For images that are denoised, denoising is done using a convolutional neural network FFDNet.

$P.$ falciparum In Vitro Cultures

Plasmodium Falciparum culture were provided where Plasmodium falciparum W2 (MRA-157) were obtained from MR4. Parasites were grown in human erythrocytes (2% hematocrit, obtained from the Blood Center) in RPMI 1640 media supplemented with 0.25% Albumax II (GIBCO Life Technologies), 2 g/L sodium bicarbonate, 0.1 mM hypoxanthine, 25 mM HEPES (pH 7.4), and 50 micrograms/L gentamycin, at 37° C., 5% $O_2$, and 5% $CO_2$.

Blood Sample from Healthy Donors and from Patients Diagnosed with Malaria

De-identified blood sample (whole blood) from healthy anonymous donors were obtained from the Blood Center in BD Vacutainer blood collection tubes. De-identified methanol-fixed finger prick blood smears from patients diagnosed with malaria were provided by UCSF Malaria Elimination Initiative (MEI)/Infectious Disease Research Collaboration, Kampala, Uganda.

Preparation and Staining of Blood Smears

Smears of blood from healthy donors and $P.$ falciparum culture were fixed by dipping in absolute methanol for 30 seconds. Fixed smears were incubated with 5 microgram/ml DAPI solution for 1 minute, washed in water, and let air dry in the dark. DAPI solution was purchased from Biotium (catalog #40043) and diluted. Samples were kept in dark before imaging.

Other Pathology Samples

Prepared slides of Loa-Loa, Leishmania donovani, Mycobacterium tuberculosis were acquired from VWR (catalog Number 470182-158, 470181-894, 470177-208 respectively). Prepared slide of Schistosomiasis of Intestines was acquired from AmScope (SKU: PS50HP). Prepared slide of Trypanosoma brucei rhodesiense was acquired from Carolina (item #295822). Prepared slides of Streptococcus pneumoniae and Staphylococcus aureus in sputum were de-identified and provided by the Clinical Microbiology Laboratory.

Statistical Analysis

Simulation of per case sensitivity and specificity (FIG. 6E) was done in MATLAB. For each parasitemia and per spot false positive rate (FPR) (and its associated per spot false negative rate FNR), 10,000 tests were simulated. In each test, the total number of platelets (N) and parasites (P)

was sampled from Poisson distributions; the number of detected parasites was the sum of true positives and false positives, both sampled from Bernoulli distribution, with parameters (P, 1-FNR) and (N, FPR).

What is claimed is:

1. A method of diagnosing an infectious disease using a spectral imaging platform, comprising:
   (a) having a sample with an added fluorescent dye;
   (b) triggering a spectral shift on an order of 10 nm by exciting the sample with added fluorescent dye with a laser excitation of about 405 nm;
   (b) imaging the spectral shift using an imaging module with a magnification ranging of about 10×;
   (c) long pass filtering the spectral shifted images using a long pass filter with a cutoff wavelength of about 435 nm;
   (d) collecting the long-passed-filtered spectral shifted images using a CMOS sensor having a color filter array in Bayer arrangements for collecting light in a plurality of channels;
   (e) analyzing color pixels of the obtained images through the CMOS sensor to determine a spectral shift using color pixel signal ratios using an automated computational module; and
   (f) classifying and diagnosing an infectious disease from the sample using the output from the automated computational module.

2. The method as set forth in claim 1, wherein the plurality of channels is two or more channels.

3. The method as set forth in claim 1, wherein the magnification has an object plane pixel size ranging from 0.2 micrometers to 5 micrometers and a field of view ranging from 0.2 millimeters to 25 millimeters.

4. The method as set forth in claim 1, wherein the infectious disease is caused by a parasite or a pathogen.

5. The method as set forth in claim 1, wherein infectious disease is caused by *Plasmodium* spp.

6. The method as set forth in claim 1, wherein the added fluorescent dye is 4',6-diamidino-2-phenylindole (DAPI).

7. The method as set forth in claim 1, wherein the sample is a blood sample, a sputum sample, or a nasal swab sample.

* * * * *